United States Patent
Anderson et al.

(10) Patent No.: US 9,052,123 B2
(45) Date of Patent: Jun. 9, 2015

(54) SOLAR MODULE INTEGRATION SYSTEM WITH THERMAL COMPENSATION

(75) Inventors: David Anderson, Wellesley, MA (US); Vasilije Jovanovic, Winchester, MA (US)

(73) Assignee: PanelClaw Group, Inc., North Andover, MA (US)

( * ) Notice: Subject to any disclaimer, the term of this patent is extended or adjusted under 35 U.S.C. 154(b) by 0 days.

(21) Appl. No.: 13/619,201

(22) Filed: Sep. 14, 2012

(65) Prior Publication Data

US 2013/0015303 A1    Jan. 17, 2013

Related U.S. Application Data

(60) Provisional application No. 61/506,490, filed on Jul. 11, 2011.

(51) Int. Cl.
| | | |
|---|---|---|
| E04D 13/18 | (2014.01) | |
| F24J 2/52 | (2006.01) | |
| H01L 31/042 | (2014.01) | |
| H02S 20/24 | (2014.01) | |

(52) U.S. Cl.
CPC .............. *F24J 2/5233* (2013.01); *Y02E 10/50* (2013.01); *Y02B 10/20* (2013.01); *Y02B 10/12* (2013.01); *F24J 2/525* (2013.01); *F24J 2/526* (2013.01); *Y02E 10/47* (2013.01); *H02S 20/00* (2013.01); *H02S 20/24* (2013.01)

(58) Field of Classification Search
CPC ........... F24J 2/525; F24J 2/526; Y02B 10/12; Y02B 10/20; Y02E 10/50; H02S 20/00; H02S 20/24

USPC .................. 136/244–246, 251; 52/84, 173.3; 126/623
See application file for complete search history.

(56) References Cited

U.S. PATENT DOCUMENTS

| | | |
|---|---|---|
| 4,226,256 A | 10/1980 | Hawley |
| 4,336,413 A | 6/1982 | Tourneux |
| 4,371,139 A | 2/1983 | Clark |
| 4,966,631 A | 10/1990 | Matlin et al. |
| 5,125,608 A | 6/1992 | McMaster et al. |
| 5,143,556 A | 9/1992 | Matlin |
| 5,228,924 A | 7/1993 | Barker et al. |

(Continued)

FOREIGN PATENT DOCUMENTS

| | | |
|---|---|---|
| DE | 27 58 067 | 7/1979 |
| EP | 0 344 523 B2 | 12/1989 |
| WO | WO-94/00650 | 1/1994 |

OTHER PUBLICATIONS

Chevalier, H.L. and Norton, D.J.; Wind Loads on Solar-Collector Panels and Support Structure; Texas A&M University-Aerospace Engineering Department; Oct. 1979.

(Continued)

*Primary Examiner* — Gwendolyn W. Baxter
(74) *Attorney, Agent, or Firm* — Foley & Lardner LLP; Christopher J. McKenna

(57) ABSTRACT

An apparatus for supporting a solar module is disclosed including: a first support member; a first wind deflector configured to be attached to the first support member; and a first attachment mechanism configured to attach the first support member to the first wind deflector and allow local motion of the first wind deflector relative to the first support member in response to thermal expansion or contraction of the first wind deflector.

16 Claims, 19 Drawing Sheets

(56) References Cited

U.S. PATENT DOCUMENTS

| | | | |
|---|---|---|---|
| 5,509,973 | A | 4/1996 | Ishikawa et al. |
| 5,524,401 | A | 6/1996 | Ishikawa et al. |
| 5,571,338 | A | 11/1996 | Kadonome et al. |
| 5,571,339 | A | 11/1996 | Ringel et al. |
| 5,706,617 | A | 1/1998 | Hirai et al. |
| 5,740,996 | A | 4/1998 | Genschorek |
| 5,746,839 | A | 5/1998 | Dinwoodie |
| 5,890,333 | A | 4/1999 | Boroviak |
| 6,061,978 | A | 5/2000 | Dinwoodie et al. |
| 6,148,570 | A | 11/2000 | Dinwoodie et al. |
| 6,495,750 | B1 | 12/2002 | Dinwoodie |
| 6,501,013 | B1 | 12/2002 | Dinwoodie |
| 6,534,703 | B2 | 3/2003 | Dinwoodie |
| 6,570,084 | B2 | 5/2003 | Dinwoodie |
| 6,617,507 | B2 | 9/2003 | Mapes et al. |
| 6,722,357 | B2 | 4/2004 | Shingleton |
| 6,730,841 | B2 | 5/2004 | Heckeroth |
| 6,784,360 | B2 | 8/2004 | Nakajima et al. |
| 6,809,251 | B2 | 10/2004 | Dinwoodie |
| 6,809,253 | B2 | 10/2004 | Dinwoodie |
| 6,856,496 | B1 | 2/2005 | Mucci et al. |
| 6,883,290 | B2 | 4/2005 | Dinwoodie |
| 6,959,517 | B2 | 11/2005 | Poddany et al. |
| 6,967,278 | B2 | 11/2005 | Hatsukaiwa et al. |
| 6,968,654 | B2 | 11/2005 | Moulder et al. |
| 7,012,188 | B2 | 3/2006 | Erling |
| 7,178,295 | B2 | 2/2007 | Dinwoodie |
| 7,260,918 | B2 | 8/2007 | Liebendorfer |
| 7,297,866 | B2 | 11/2007 | Aschenbrenner |
| 2003/0010375 | A1 | 1/2003 | Dinwoodie |
| 2003/0015636 | A1 | 1/2003 | Liebendorfer |
| 2004/0007260 | A1 | 1/2004 | Dinwoodie |
| 2004/0163338 | A1 | 8/2004 | Liebendorfer |
| 2005/0126621 | A1 | 6/2005 | Dinwoodie et al. |
| 2005/0144870 | A1 | 7/2005 | Dinwoodie |
| 2005/0229924 | A1 | 10/2005 | Luconi et al. |
| 2005/0257453 | A1 | 11/2005 | Cinnamon |
| 2006/0118163 | A1 | 6/2006 | Plaisted et al. |
| 2007/0144575 | A1 | 6/2007 | Mascolo et al. |
| 2007/0151594 | A1 | 7/2007 | Mascolo et al. |
| 2007/0212935 | A1 | 9/2007 | Lenox |
| 2010/0116324 | A1 | 5/2010 | O'Brien et al. |
| 2010/0212715 | A1 | 8/2010 | Almy et al. |
| 2010/0219304 | A1 | 9/2010 | Miros et al. |
| 2010/0243023 | A1 | 9/2010 | Patton et al. |
| 2011/0024582 | A1 | 2/2011 | Gies et al. |
| 2012/0273029 | A1* | 11/2012 | Bragagna et al. ............. 136/251 |
| 2012/0312355 | A1* | 12/2012 | Patton et al. ................. 136/251 |

OTHER PUBLICATIONS

Cochran, Leighton S.; Influence of Porosity on the Mean and Peak Wind Loads for Three Concentrator Photovoltaix Arrays; Thesis for the Degree of Master of Science Colorado State University; Fall 1986.

Development of a Flat Roof Integrated Photovoltaic System (SOFREL); Phase 1 Report of the Sofrel R&D project; Mar. 1994.

Farrington, Robert; Building Integrated Photovoltaics; National Renewable Energy Laboratory Technical Monitor; Jan. 1993.

Fuentes, Martin K.; A Simplified Thermal Model for Flat-Plate Photovoltaic Arrays; Sandia Report, May 1987.

International Search Report dated Sep. 18, 2012 PCT/US2012/046285.

Kern, Jr., Edward C.; Low-cost PV Array Mounting for Flat-Roof Buildings; Third International Workshop on Photovoltaics in Buildings, Sep. 1994.

Peterka, J.A. et al.; Mean Wind Forces on Parabolic-Trough Solar Collectors; Sandia National Laboratories—Colorado State University; May 1980.

Report to US Deparment of Energy Office Building Technologies: Building Integrated Photovoltaics (BIVP)—Analysis and US Market Potential; Feb. 1995.

Russell Miles C. and Kern, Jr., Edward C.; PV Array Designes for Flat-Roof Buildings; 1993 IEEE.

Stafford, Byron; Design Considerations and Performance of Maspeth a-Si PV System; 1994 American Institute of Physics.

International Search Report and Written Opinion in International Application No. PCT/US2009/038496 dated May 28, 2009.

Non-Final Office Action for U.S. Appl. No. 12/056,791 dated Dec. 9, 2009.

Final Office Action for U.S. Appl. No. 12/056,791 dated Jul. 7, 2010.

Non-Final Office Action for U.S. Appl. No. 12/056,791 dated Apr. 11, 2012.

B. Bienkiewicz and R.N. Meroney: "Wind Effects on Roof Ballast Pavers" Journal of Structural Division, American Society of Civil Engineering. Revised Sep. 1986 and again Jun. 1987 (34 pages).

Bhaduri, S. and Murphy, L.M.: "Wind Loading on Solar Collectors" prepared for the U.S. Dept. of Energy for contract No. DE-AC02-83CH10093, Golden, CO., Jun. 1985 (50 pages).

Chevalier, H.L. and Norton, D.J.: "Wind Loads on Solar Collector Panels and Support Structure" sponsored by the U.S. Dept. of Energy contract No. EV-76-S-05-5130, Oct. 1979 (98 pages).

Cochran, Leighton S., "Influence of Porosity on the Mean and Peak Wind Loads for Three Concentrator Photovoltaic Arrays" Colorado State University, Fort Collins, CO 1986 (14 pages).

Delmarva Power and Light Co.: "Development of a Dispatchable PV Peak Shaving System" Prepared for the US Dept of Energy Cooperative Agreement No. DE-FC-93CHI0569. Oct. 1995.

Farrington, Robert and Kiss Cathcart Anders Architects, P.C.: Building Integrated Photovoltaics from the National Renewable Energy Laboratory for the U.S. Dept. of Energy under Contract No. DE-AC36-83CH10093, Jan. 1993 (64 pages).

Frantzis, Lisa, et al.:CBuilding-Integrated Photovoltaics (BIPV) Analysis and US Market Potential, for Building Equipment Div., US Dept of Energy Contract No. DE-AC01-90CE23821 Feb. 1995 (176pages).

Fuentes, Martin: "Simplified Thermal Model for Flat-Plate Photovoltaic Arrays" Prepared by Sandia National Laboratories, Albuquerque, NM, May 1987 (60 pages).

Hersch, Paul; Strawn, Noni; Piekarski, Dick; Cook, Gary: "Photovoltaics for Residential Applications" Technical Information Branch, Solar Energy Research Institute, published Feb. 1984 (23 pages).

Kem, Dr. Edward C. Jr., Ascension Technology: "Low-Cost PV Array Mounting for Flat-roof Buildings" from the Third International Workshop on Photovoltaics in Buildings, Lincoln Center, MA (3 pages).

Kem, Edward C. Jr. and Russell, Miles C.: Array Designs for Flat-Roof Buildings retrieved from 1993.

Kem, Edward C., Jr. and Russell, Miles C.: Rotating Shadow Band Pyranometer Irradiance Monitoring for Photovoltaic Generation Estimation from the 22nd IEEE Photovoltaic Specialists Conference—1991 vol. 1, Las Vegas, NV (7 pages).

Murphy, L.M.: "Wind Loading on Tracking and Field Mounted Solar Collectors", prepared by Solar Energy Research Institute, Golden, CO. for the U.S. Dept. of Energy, Dec. 1980 (10 pages).

Peterka, J.A., Sinou, J.M., and Cermak, J.E.: "Mean Wind Forces on Parabolic-Trough Solar Collectors" prepared for Sandia National Laboratories under Contract No. 13-2412, May 1980 (121 pages).

PV Specifications retrieved from the internet by Greg Pearen, Mar. 23, 2001 (11 pages).

Radu, Adrian; Axinte, Elena; and Theohari, Christina: "Steady Wind Pressures on Solar Collectors on Flat-Roofed Buildings" Journal of Wind Engineering and Industrial Aerodynamics, 23 (1986) 249-258 Elevator Science Publishers B.B., Amsterdam (10 pages).

Russell, M.C.: Solar Photovoltaic Systems for Residences in the Northeast, Lexington, MA, 1980 (7 pages).

(56) References Cited

OTHER PUBLICATIONS

Russell, Miles C. and Kern, Edward C. Jr.: "Stand-Off Building Block Systems for Roof-Mounted Photovoltaic Arrays Sandia Contract" 58-8796. Retrieved through Wisconsin Tech Search. Jun. 1986 (212 pages).

Siemens Solar Electric Modules Installation Guide, 1990 (8 pages).

Stafford, Byron: "Design Considerations and Performance of Maspeth a-Si PV System" American Institute of Physics, 1994 (8 pages).

Stiebel Eltron GmbH & Co.: KG: "Mount for the installment of Solar Panels" retrieved from German Patent Office, published Aug. 26, 1982 (9 pages).

Technical Information Branch, Solar Energy Research Institute: "Photovoltaics for Residential Applications" operated for the U.S. Dept. of Energy by Midwest Research Institute, Golden, CO, Feb. 1984 (23 pages).

Tieleman, H.W. et al.: "An Investigation of Wind Loads on Solar Collectors" prepared for the U.S. Dept. of Commerce National Bureau of Standards for contract No. EO-A01-78-3605, Jan. 1980 (173 pages).

Toggweiler, Peter, et. al.:Development of a flat-roof integrated photovoltaic system (SOFREL) Zurich, Switzerland, Mar. 1994 (189 pages).

* cited by examiner

SOLAR MODULE INTEGRATION SYSTEM WITH THERMAL COMPENSATION

CROSS REFERENCE TO RELATED APPLICATIONS

The current application is a continuation of International PCT Application No. PCT/US2012/046285 filed Jul. 11, 2012, which in turn claims the benefit of U.S. Provisional Patent Application Ser. No. 61/506490 filed Jul. 11, 2011, the entire contents of each of which are incorporated herein by reference.

The current application is also related to U.S. Provisional Patent Application Ser. No. 61/229,622 filed Jul. 29, 2009; U.S. Provisional Patent Application Ser. No. 61/506,490 filed Jul. 11, 2011; U.S. patent application Ser. No. 12/056,791 filed Mar. 27, 2008; U.S. patent application Ser. No. 12/846,259 filed Jul. 29, 2010; and U.S. Provisional Patent Application Ser. No. 61/581894 filed Dec. 30, 2011, the entire contents of each of which are incorporated herein by reference.

BACKGROUND

Embodiments of the present inventions are directed to systems, devices for use with systems, and method of mounting and retaining solar panels.

Solar (photovoltaic) panels are often manufactured in the form of flat rigid structures. To facilitate the performance of the function of generating electricity, solar panels may be mounted in an area exposed to the sun or other source of light. Often, it is desirable to mount solar panels outdoors at an angle from the horizontal so that they will more directly face the sun during peak daylight hours as opposed to panels mounted flat on the ground. In some applications, it may be desirable to mount a number of solar panels together in an array in order to combine the power generation capabilities of the individual panels. In many instances, it may be desirable that mounting systems for solar panel arrays retain the solar panels in place. This may be accomplished by attaching the solar panels to one another in a mounting system and/or by mounting the panels to the mounting system.

For example, U.S. Patent Application Publication No. 2007/0133474 to Mascolo et al. describes a supported solar panel assembly including a solar panel module comprising a solar panel and solar panel module supports including module supports having support surfaces supporting the module, a module registration member engaging the solar panel module to position the solar panel module on the module support, and a mounting element. U.S. Pat. No. 6,534,703 to Dinwoodie describes a solar panel assembly for use on a support surface comprising a base, a solar panel module, a multi-position module support assembly, and a deflector.

SUMMARY

According to one aspect of the current inventions there is provided a solar module mounting system. The solar module mounting system comprises a ballast, a sole mechanically coupled to a bottom surface of the ballast, a link member embedded in the ballast, an attachment module mechanically coupled to the link member, and a deflector mechanically coupled to the link member.

According to another aspect of the current inventions there is provided a solar module mounting system component. The solar module mounting system component comprises a ballast and a link member embedded in the ballast. The link member is adapted for coupling to a solar panel module.

According to another aspect of the current inventions there is provided a link member for a solar module mounting system. The link member comprises a first portion including a first facility for attaching to a solar panel module, a second portion including a second facility for attaching to a second portion of a solar panel module, and a third portion adapted to receive and substantially carry the weight of a first ballast.

According to another aspect of the current inventions there is provided a link member for a solar module mounting system. The link member comprises a first surface including a first facility for attaching to a first portion of a solar panel module, a second surface coupled to the first surface including a second facility for attaching to a second portion of a solar panel module, and a grounding facility.

According to another aspect of the current inventions there is provided an attachment module for a solar module mounting system. The attachment module comprises a first section with a first surface a second section with a second surface. A second section is coupled to the first section. The first surface is spaced from the second surface. The second section defines a threaded hole. The attachment module further comprises a fastener for retaining a portion of a solar panel module between the first surface and the second surface.

According to another aspect of the current inventions there is provided a solar module mounting system. The solar module mounting system comprises a ballast, a link member comprising a ballast platform onto which the ballast is fixedly mounted, an attachment module mechanically coupled to the link member, and a deflector mechanically coupled to the link member.

According to another aspect of the current inventions there is provided a solar module array. The solar module array comprises a plurality of solar module mounting elements. The solar module mounting elements comprises a ballast, a link member mechanically coupled to the ballast, an attachment module mechanically coupled to the link member, and a deflector mechanically coupled to the link member. A solar panel module is mechanically coupled to the plurality of solar module mounting elements.

According to a further aspect of the current inventions there is provided a method of forming a shoe of a solar module mounting system. The method comprises forming a link member from a metal sheet by cutting, bending, and galvanizing the metal sheet, inserting the link member into a mold, pouring concrete into the mold and about the link member, thereby forming a ballast with an embedded link member; and mechanically fixing a sole to a bottom surface of the ballast.

According to a further aspect of the current inventions there is provided a method of mounting a solar panel module. The method comprises forming a link member, forming a ballast, attaching the ballast to the link member, bonding a sole to a lower surface of at least one of the ballast and the link member, attaching a solar panel module to the link member with an attachment module member routing a wiring from the solar panel module through the at least one wire chase, and attaching a deflector module to the link member.

According to a further aspect of the current inventions there is provided a method of installing a solar panel array. The method comprises acts of providing a solar panel, coupling an attachment module to the solar panel, after coupling the attachment module to the solar panel, coupling the attachment module to a support member.

According to a further aspect of the current inventions there is provided a method of installing a solar panel array. The method comprises acts of providing a support mechanism, providing a solar panel, selecting a height on the solar panel for attaching the panel, and attaching the panel at the selected height.

According to a further aspect of the current inventions there is provided a support mechanism for a solar panel to be installed on a roof. The support mechanism comprises a ballast, a link member in contact with the ballast so that the link member and ballast are maintained in a secure relationship, and a sole to protect the roof from damage from the linking member and ballast In another aspect, an apparatus for supporting a solar module is disclosed including: a first support member; a first wind deflector configured to be attached to the first support member; and a first attachment mechanism configured to attach the first support member to the first wind deflector and allow local motion of the first wind deflector relative to the first support member in response to thermal expansion or contraction of the first wind deflector.

Some embodiments include a second wind deflector, and where: the first attachment mechanism is configured to attach the second wind deflector to the first support member in a fixed fashion substantially preventing local motion of the second wind deflector relative to the first support member in response to thermal expansion or contraction of the wind deflector.

In some embodiments, when attached to the first support member, at least a portion of the first and second wind deflectors overlap at the first support member and the attachment mechanism is configured to allow the first support member to slide relative to the second wind deflector.

In some embodiments, when attached to each other, the first support member and the second wind deflector cooperate to restrict movement of the first wind deflector relative to the second wind deflector along a first direction, while allowing movement of the first wind deflector relative to the second wind deflector along a second direction transverse to the first.

In some embodiments, the first wind deflector includes at least one elongated slot; the second wind deflector includes at least at least one hole having a maximum dimension smaller than the maximum dimension of the elongated slot; and the first attachment mechanism includes a mounting tab on the support member. In some embodiments, the mounting tab includes: a mounting surface; and a mounting protrusion extending in a direction transverse the mounting surface. In some embodiments, the mounting surface is configured to receive the first and second wind deflectors such that: at least a portion of the first wind deflector is in contact with the mounting surface at least a portion of the second wind deflector overlays the portion of the first wind deflector in contact with the mounting surface; and the mounting protrusion extends through the elongated slot in the first wind deflector and the hole in the second wind detector.

In some embodiments, the attachment mechanism includes a fastener configured to be received on the protrusion and restrict motion of the first and second wind deflectors in the direction transverse to the mounting surface.

In some embodiments, the protrusion include a threaded bolt member and the fastener include a nut.

In some embodiments, the mounting surface includes one or more features configured to position the second deflector, when attached to the first support member, to define a gap space between the second wind deflector and the first support member that receives a portion of the first wind deflector. In some embodiments, the portion of the first wind deflector in the gap is able to slide between the second wind deflector and the first support member along the mounting surface.

In some embodiments, when attached to the first support member, the portion of the first wind deflector in the gap maintained flush against the mounting surface.

In some embodiments, when attached to the first support member, the portion of the first wind deflector in the gap positioned flush with the mounting surface floats within the gap.

In some embodiments, at least one of the wind deflectors includes detent configured to apply pressure between the wind deflector and another wind deflector or the first support member, without substantially preventing movement of the first wind deflector relative to the second wind deflector along a second direction.

Some embodiments include a second support member; a second attachment mechanism configured to attach the first wind deflector to the second support member in a fixed fashion substantially preventing local motion of the first wind deflector relative to the second support member in response to thermal expansion or contraction of the first wind deflector.

Some embodiments include a third wind deflector, and where the second attachment mechanism is configured to attach the second support member to the third wind deflector while allowing local motion of the third wind deflector relative to the second support member in response to thermal expansion or contraction of the third wind deflector.

In some embodiments, when attached to the second support member, at least a portion of the first and third wind deflectors overlap. In some embodiments, the second attachment mechanism is configured to allow the third wind deflector to slide relative to the first wind detector.

In some embodiments, at least one of the wind deflectors includes: an elongated member extending from a first end to a second end. In some embodiments, the first end includes at least one elongated slot; and the second end includes at least at least one hole having a maximum dimension smaller than the maximum dimension of the elongated slot.

In another aspect, a method of supporting a solar module is disclosed including: obtaining a first support member; attaching a first wind deflector to the first support member using a first attachment mechanism in a fashion that allows local motion of the first wind deflector relative to the first support member in response to thermal expansion or contraction of the first wind deflector.

Some embodiments include using the first attachment mechanism, attaching a second wind deflector to the first support member in a fixed fashion to substantially prevent local motion of the second wind deflector relative to the first support member in response to thermal expansion or contraction of the wind deflector.

In some embodiments, when attached to the first support member, at least a portion of each of the first and second wind deflectors overlap at the first support member to allow the first support member to slide relative to the second wind deflector.

Some embodiments include, causing the first support member and the second wind deflector cooperate to restrict movement of the first wind deflector relative to the second wind deflector along a first direction, while allowing movement of the first wind deflector relative to the second wind deflector along a second direction transverse to the first.

In another aspect, a solar module mounting system is disclosed including: a plurality of the apparatus for supporting a solar panel of any of the types described herein, configured to support an array of solar modules, where, during operating, the attachment mechanisms operate to reduce or eliminate system wide mechanical forces caused by thermal and expansion of the wind deflectors.

In some embodiments, during operating, the attachment mechanisms operate to substantially eliminate system wide mechanical forces caused by thermal and expansion of the wind deflectors.

In various embodiments, any of the above described devices, techniques, systems, elements, steps, etc. may be used, either alone, or in any suitable combination.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
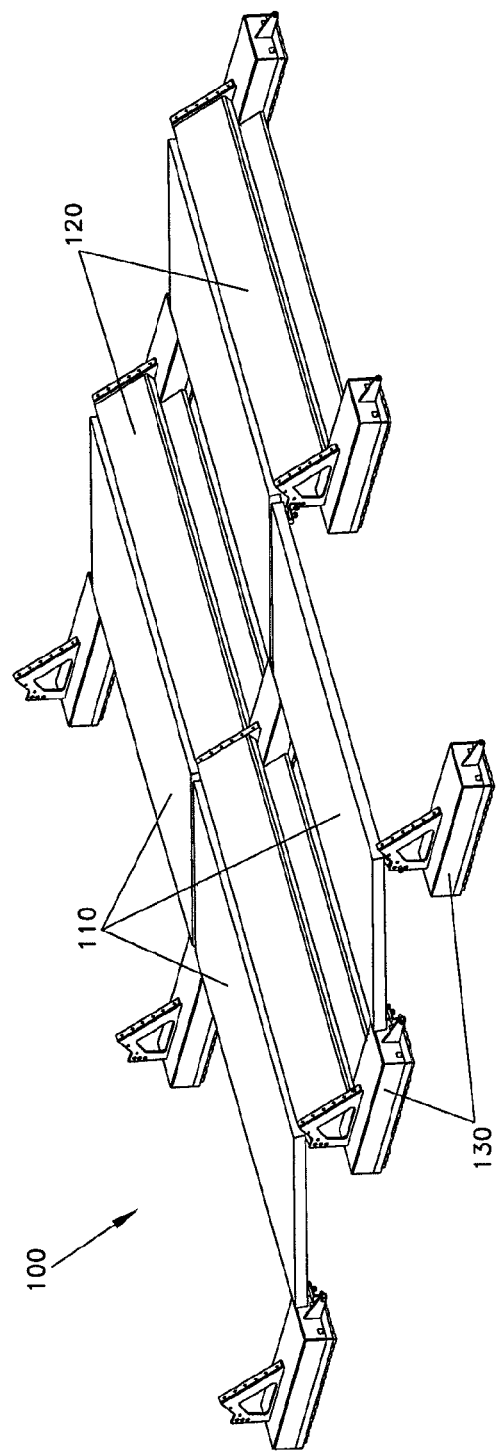
FIG. 1 is an array of solar panel modules according to an aspect of the present inventions.

This inventions described herein are not limited to the details of construction and the arrangement of components set forth in the following description or illustrated in the drawings. The inventions are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. The description of one aspect of the inventions disclosed herein is not intended to be limiting with respect to other aspects of the present inventions.

FIG. 1 illustrates an example of a section of an array of solar panel modules 100 according to an aspect of the present inventions that may be deployed on, for example, a large flat roof as may be found on large commercial buildings; aspects of the present invention may be applied to other roof structures and other mounting surfaces.

The array 100 in this example includes a plurality of solar panel modules 110. The solar panel modules 110 are illustrated in FIG. 1 as being mounted at an angle from the horizontal, but in some embodiments, the solar panel modules may be mounted at angles other than that illustrated in FIG. 1 or even horizontally. The solar panel modules 110 may in some embodiments be mounted at different angles throughout the array 100 and uniformly in others such as the one shown in FIG. 1. The array 100 also includes a plurality of deflector elements 120. These deflector elements 120 are located in FIG. 1 facing what will be described herein as the Top side of array 100. What is described as the Top side may correspond to geographical North position of the array. As shown here, the Top side may be positioned approximately to the North so that the tilted faces of the panel modules are directed generally toward the South, e.g., tilted to more squarely face the direction of the sun for an installation north of the equator. In some embodiments, each solar panel module 110 may have a corresponding deflector element 120, but in some embodiments, at least one of the solar panel modules 110 in an array 100 may not have an accompanying deflector element 120. For example, in one embodiment, deflectors are positioned only on panel modules at the Top edge of the array. In some embodiments, additional deflector elements (not shown) may be mounted facing the lateral sides (i.e., the sides perpendicular to the Top side) at the edges of the array, roughly perpendicular to the deflector elements 120 illustrated in FIG. 1. In another embodiment, deflectors are positioned only on the Top and side edges of the array.

The deflector elements 120 and solar panel modules 110 in this example are mounted on shoes 130. A shoe is a support structure that may be used to support at least a portion of a solar panel; in this example, the show is used to support a corner of a solar panel, and in this example, can be used to support up to four corners of the panel. An example of shoes is described more fully below with respect to FIG. 3.

Figure 2:
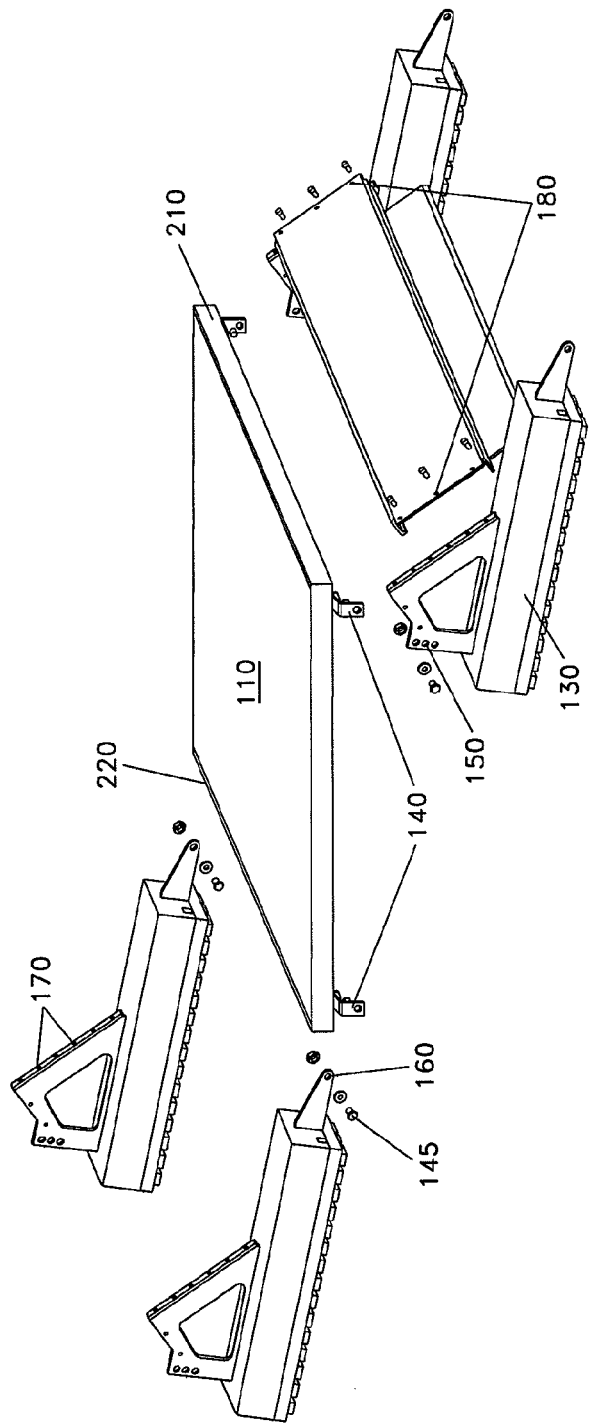
FIG. 2 is an exploded view of a section of a solar module mounting system according to an aspect of the present inventions.

FIG. 2 is an exploded view of one section of the array 100 in the example of FIG. 1. FIG. 2 illustrates one embodiment of attachment module 140 according to one aspect of the present inventions, mounted proximate the corners of solar panel module 110. In this example the attachment modules 140 may be made of a metal such as aluminum. In some embodiments, the attachment modules 140 may be made of a conductive material to assist in grounding of the panel modules or may include a grounding path.

In this example, attachment module 140 includes an attachment mechanism which is this example is a threaded hole for a bolt which may be used to attach the attachment modules 140 to a solar panel module 110. The attachment module 140 may also include second, non-threaded holes for bolts 145 that may used to attach (or facilitate attaching) an attachment module 140 to a shoe 130. Other attachment mechanisms may be employed with attachment modules 140, including, for example, screws, adhesives, clips, or solder. Since many commercially available solar panels include a similar edge, this particular attachment module is compatible for use with solar panels provided by multiple suppliers. This particular attachment module is also compatible for use with solar panel mounting systems provided by multiple suppliers. Other designs for compatibility with multiple suppliers may be provided based on the disclosure provided herein and different attachment modules may be designed for use with different solar panels but made compatible for use with a common shoe configuration.

In this example, the shoe 130 includes a facility to permit attachment of panels to the shoe. In this example, rear mounting holes 150 are provided on the upper rear portion of shoe 130 and provide locations for the attachment of attachment modules 140. In some embodiments, an attachment module 140 mounted to shoe 130 through rear mounting holes 150 may be attached to a solar panel module 110 proximate a top edge 210 of the solar panel module 110 that is vertically higher than a bottom edge 220 of the solar panel module when the solar panel module 110 is mounted on some embodiments of certain aspects of the present inventions. The bottom edge 220 of solar panel module 110 may be attached with another attachment module 140 to a forward mounting hole 160 on another shoe 130.

In the embodiment of FIG. 2, the mechanism that assists in attachment of panel module 110 to shoes 130 includes a link (this example of a link element being described more fully below) that allows attachment of panel in more than one location. In this example, a plurality of rear mounting holes 150 are provided on shoes 130 (rather than a single hole, for example). This allows for the system according to some embodiments to accommodate fluctuations in the height of a roof or other surface upon which the system may be mounted and/or for mounting panels at different angles. In this example, shoes 130 may include three rear mounting holes 150 spaced 0.75 inches vertically apart from one another, which allows the system to accommodate up to five degree undulations in a roof or other mounting surface upon which it may be mounted. Other mechanisms may be employed in other embodiments to facilitate attachment of panel to shoe and those embodiments may (or may not) provide flexibility in ability to vary the height of attachment with respect to the shoe either by allowing multiple attachment points as in this example or by allowing slidable adjustment, as would be readily designed by one of skill in the art based on the disclosure provided herein.

As further illustrated in FIG. 2, shoes 130 may also include a mechanism to assist in mounting a deflector 120. In this example, the mounting mechanism includes deflector mounting holes 170 on shoes 130. Deflector 120 may be attached to shoes 130 by fasteners passing through holes 180 in the edge of deflector 120 and deflector mounting holes 170 of shoes 130.

Figure 3:
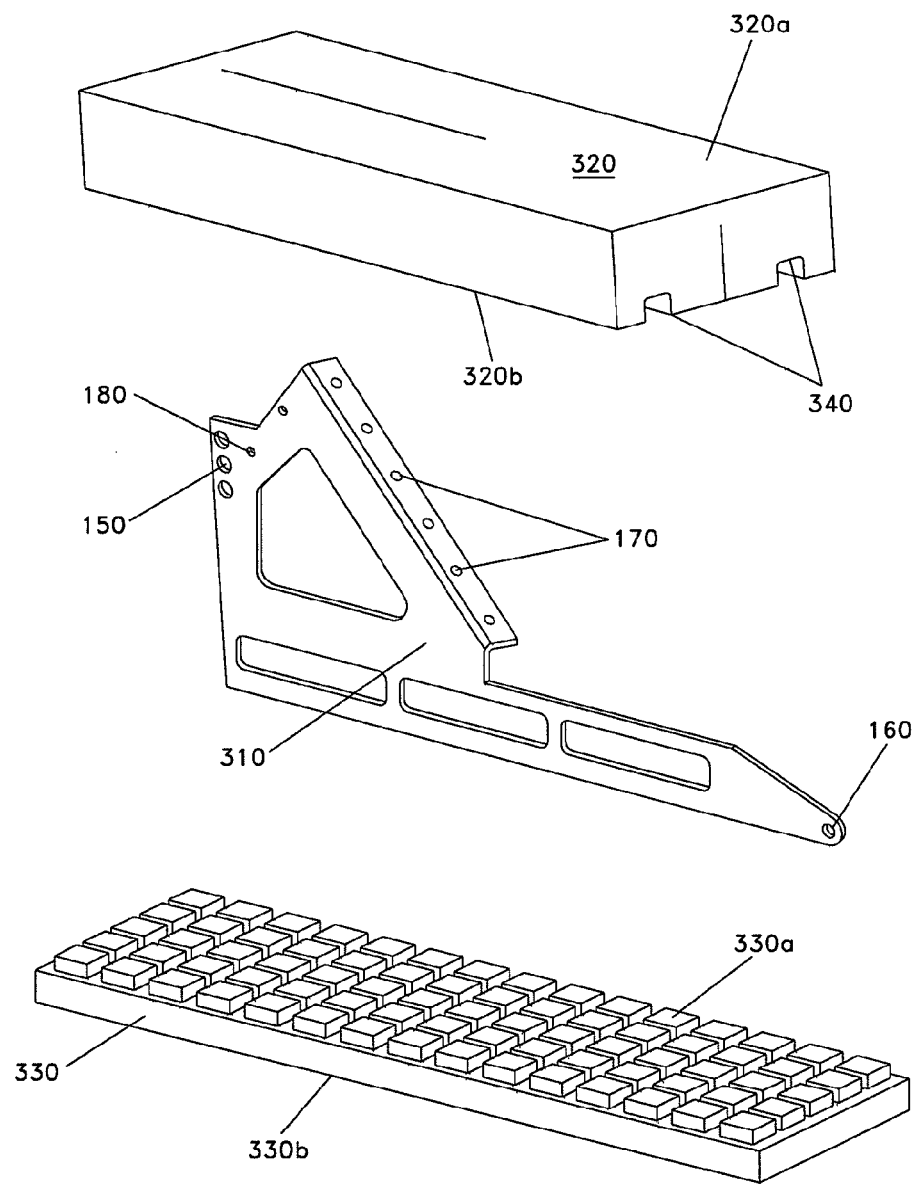
FIG. 3 is an exploded view of a shoe element of FIG. 2.

FIG. 3 illustrates in more detail an example of a shoe 130 according to an aspect of the present inventions. In FIG. 3, the shoe 130 is illustrated in an exploded view. In this example, the shoe 130 comprises three sub-elements: a link 310, a ballast 320, and a sole 330.

Link 310 provides an attachment mechanism for attachment module 140. Link 310 may comprise three sets of mounting holes.

Rear mounting holes 150 may be used to mount an attachment module 140 for attachment to a top end of a solar panel module 110 to shoe 130. In some embodiments, there may be three of rear mounting holes 150, and in some embodiments there may be a greater or lesser number of rear mounting holes 150 or some other mechanism to facilitate attachment.

In this example, a facility for attaching a solar panel module to a shoe at the bottom edge of the solar panel module is also provided. In this embodiment, forward mounting hole 160 may be used to mount an attachment module 140 for attachment to a bottom end of a solar panel module 110 to shoe 130. In some embodiments, there may be more than one forward mounting hole 160, or another attachment mechanism may be employed. This may provide greater flexibility of mounting options, for example, to allow a user to select an upper or a lower forward mounting hole 160 to compensate for variations in height of a surface upon which shoe 130 may be mounted.

In this example, the link also includes a mechanism to facilitate attachment of deflectors. In this embodiment, deflector mounting holes 170 may be used to attach a deflector 120 to shoe 130. A plurality of mounting holes 170 may be provided in shoe 130. This may allow for flexibility in the positioning of deflector 120 on shoe 130. In other embodiments, alternative deflector mounting mechanisms may be used instead of or in addition to mounting holes 170 on shoe 130. For example, in some embodiments, e.g., as detailed below with reference to FIGS. 14A-17B, the mechanism to facilitate attachment of deflectors may be designed to compensate for thermal expansion and contraction in the array 100.

In some embodiments, an integrated grounding attachment 180 may be provided in link 310. Integrated grounding attachment 180 may be in the form of a hole to which a grounding wire of a solar panel module 110 may be attached, or may be an eyelet or other grounding attachment mechanism to assist in providing an electrical connection to ground from panel to panel.

In the embodiment according to FIG. 3, ballast 320 provides shoe 130 with mass that may assist in keeping array 100 securely in place on a roof or other surface. Ballast 320 may also contain one or more wire chases 340 that can be used for running electrical wire through the shoe 130. Wire chases 340 provide shoe 130 with integrated wire management and integrated grounding capabilities. These wire chases 340 may be molded or cut into the ballast 320, or may be formed by casting, for example, ½" diameter (or greater) pieces of PVC pipe or other material into ballast 320 during the manufacture thereof. In other embodiments, a facility for passing wires may be integrated elsewhere in the shoe, such as in the sole or on top of the ballast.

In this example, sole 330 may provide friction to keep array 100 securely in position on a roof or other mounting surface and/or may be configured to help protect the roof or other mounting surface from damage from ballast 320 and/or permit water to pass under it. Sole 330 may comprise a patterned bottom surface 330b which may enhance the friction of sole 330 against a mounting surface. The bottom surface 330b of sole 330 may have a basic waffle cut pattern. Other patterns (or no pattern) may be employed in other embodiments. Sole 330 may also have a patterned upper surface 330a which may facilitate attachment of sole 330 to ballast 320, as will be explained in more detail below. The upper surface 330a of sole in the embodiment illustrated in FIG. 3 has a basic waffle cut pattern. Other patterns (or no pattern) may be employed in other embodiments. Sole 330 may be joined to ballast 320 at upper surface 330a using a suitable adhesive such as epoxy, although other attachment mechanisms would be readily apparent to one of skill in the art based on the disclosure provided herein.

Ballast 320 is illustrated in FIG. 3 with a slot into which link 310 may be mounted. In some embodiments, link 310 may be inserted into ballast 320 after both elements are formed, and in other embodiments, ballast 320 may be cast or molded about link 310.

Ballast 320 may in some embodiments be made from a concrete mix. Ballast 320 in some embodiments may be made from any concrete mix that is intended to withstand the elements for an appropriate period of time, such as cement intended for outdoor applications and having an intended life span of 30+ years. Ballast 320 may in some embodiments be made using a Portland Type III concrete with air entrainment of about 5%. This concrete is a high early strength, normal weight concrete with a fully cured strength of 5,000 psi, and is available from Precast Specialties Inc. of Abington, Mass. Alternatively, ballast 320 may be formed from materials such as, for example, metal, natural or recycled rubber, or Quazite®, a polymer concrete available from Hubbell Lenoir City, Inc. of Lenoir City, Tenn., or other materials.

Link 310 can be made from metals such as stainless steel, mild steel, aluminum, UV resistant plastic, fiberglass, concrete, or other materials. In some embodiments, link 310 may be made from 0.075 inch thick cold rolled mild steel. The mild steel may be cut, bent into the shape of link 310, and then hot-dip galvanized. Where a conductive material is used, the link may be used to assist in passing an electrical ground connection among panels.

In some embodiments, sole 330 may be made from any material that can be considered an "inert pad" by the roofing industry. In some embodiments, sole 330 may be made from recycled, non-vulcanized crumb rubber, such as that available from Unity Creations Ltd. of Hicksville, N.Y. In other embodiments sole 330 may be made from natural rubber, EPDM (Ethylene Propylene Diene Monomer—a rubber roofing material), or another roofing material that may protect the roof or other surface upon which array 100 may be mounted from damage by the material of ballast 320. Sole 330 may be adhered to ballast 320 using an adhesive, such as, for example, epoxy. In some embodiments, an epoxy known as ChemRex 948 may be used. In other embodiments, sole 330 may comprise a rubber pad cast directly into ballast 320. Sole 330 may be cast directly into ballast 320 by for example, providing sole 330 with rubber teeth and/or with pits or inclusions. Concrete, or other material from which a ballast 320 may be formed, could be poured onto sole 330 on the side with the rubber teeth and/or pits or inclusions, and the teeth will mold into the concrete or other material and be bonded to it, and/or the concrete or other material will fill the pits or inclusions and thereby bond to the sole 330. Sole 330 may additionally or alternatively be secured to ballast 320 by a fastener or fasteners such as, for example, screws or bolts.

Figure 4:
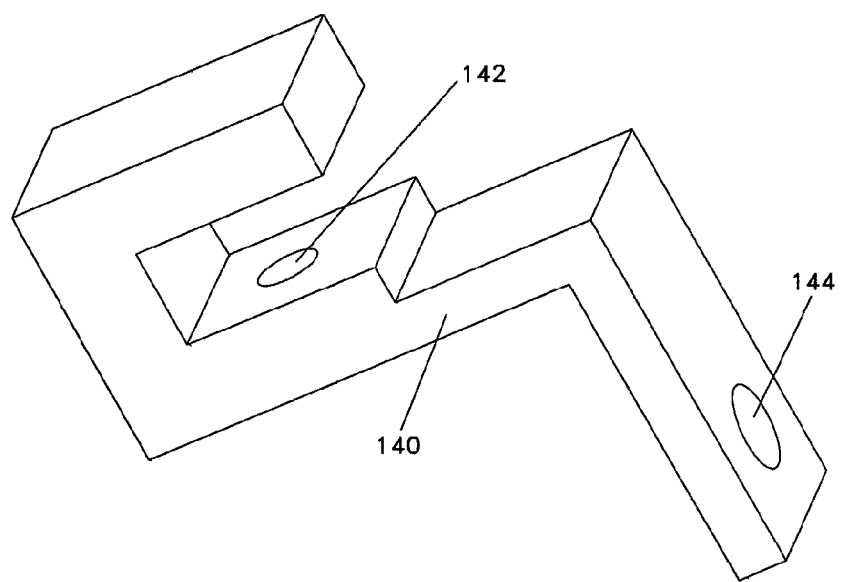
FIG. 4 is an attachment module of a solar module mounting system according to an aspect of the present inventions.

FIG. 4 is an enlarged view of attachment module 140. Attachment module 140 may in some embodiments be made from 6061-T6 aluminum which can be anodized if desired. The attachment module 140 can also be made from other metal or some other material of sufficient strength. Where a conductive material is selected, the attachment module may be used to assist in passing ground among panels.

The attachment module may be formed by machine cutting, but can also be extruded, laser cut, or water jet cut or formed using another suitable manufacturing method.

In one embodiment, attachment module 140 is configured to permit it to be attached to a plurality of different panel modules and/or panel module mounting systems available in the market.

Attachment module 140 may in some embodiments include a threaded hole 142 and a non-threaded hole 144. In this example, attachment module 140 may be attached to a shoe 130 with an appropriate attachment mechanism. In this example a bolt is used to attach attachment module 140 to a shoe 130. In other embodiments, a metal pin or a clip may be used, or other attachment devices or mechanisms as would be apparent to one of skill in the art based on the disclosure provided herein.

Figure 5:
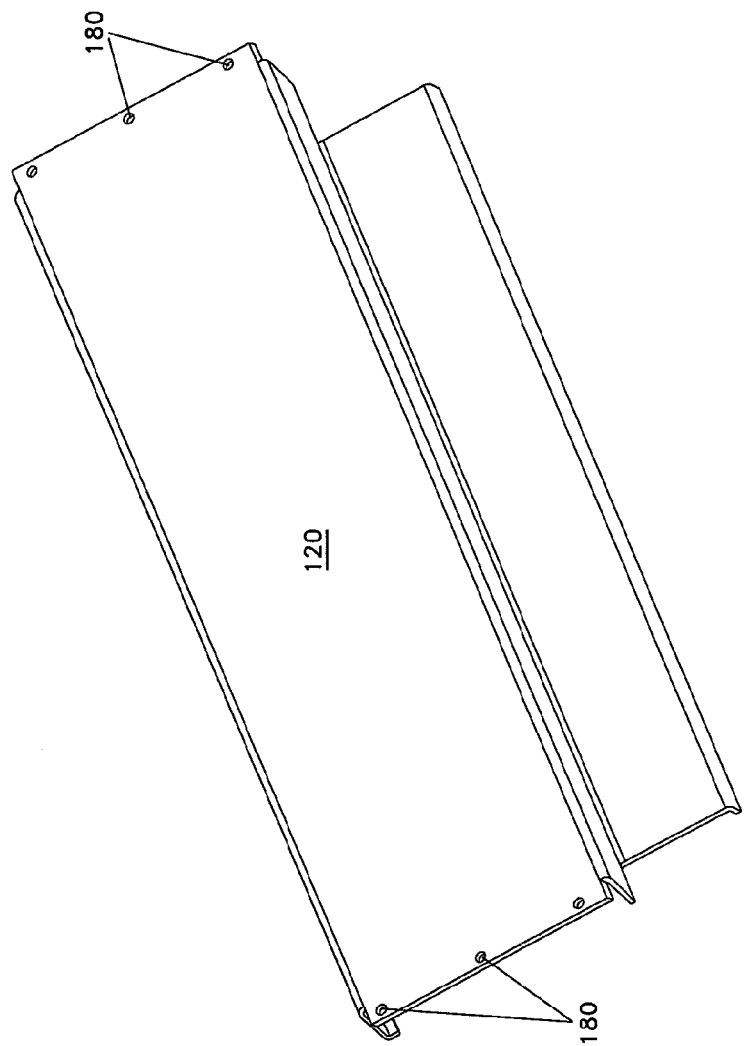
FIG. 5 is a deflector element of a solar module mounting system according to an aspect of the present inventions.

FIG. 5 is an isometric view of deflector 120. Deflector 120 can be made of metal, fiberglass, UV resistant plastic, concrete, or other suitable materials. In one embodiments, deflector 120 may be manufactured by cutting, bending, and galvanizing mild steel.

In this example, the deflector 120 includes a mechanism to facilitate attachment to a shoe 130. In this embodiment that mechanism includes three holes 180 along each side of deflector 120 for attachment to a shoe 130. In other embodiments, more holes may be provided in deflector 120 to provide for more secure attachment to shoe 130 and/or greater flexibility in positioning of deflector 120 on shoe 130. In other embodiments, fewer mounting holes may be provided in deflector 120.

The mounting holes 180 of deflector 120 (or any other mounting holes that may be a part of the mechanism for attachment) may be in the form of round holes, or in some embodiments, slots permitting sliding adjustments. In some embodiments, deflector 120 may include mounting tabs (not shown) extending from the sides of deflector 120 in which mounting holes 180 may be located. Mounting tabs in which the mounting holes are located may be offset from one another on either side of deflector 120 so that two deflectors can be mounted side by side utilizing a plurality of collinear holes 170 on a single link 310 of a shoe 130 so that the tabs of one deflector 120 do not interfere with the tabs of the other deflector 120.

Figure 6:
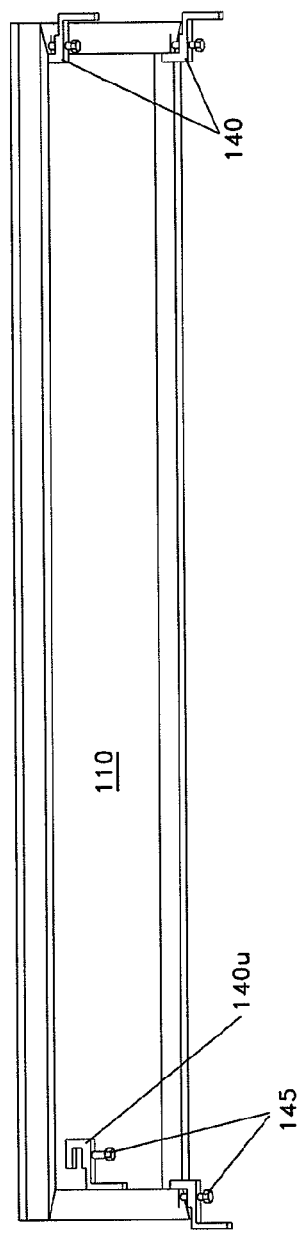
FIG. 6 is a view from the rear underside of a solar panel module illustrating attachment modules mounted on the solar panel module according to an aspect of the present inventions.
Figure 7:
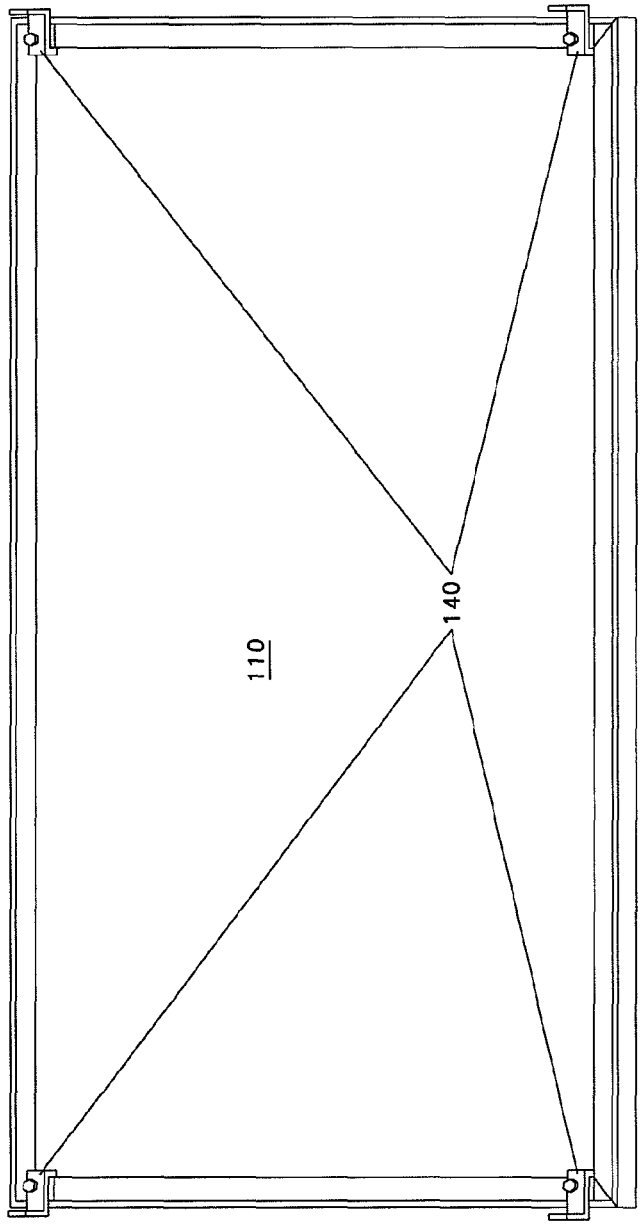
FIG. 7 is a view from underneath a solar panel module illustrating attachment modules mounted on the solar panel module according to an aspect of the present inventions.
Figure 8:
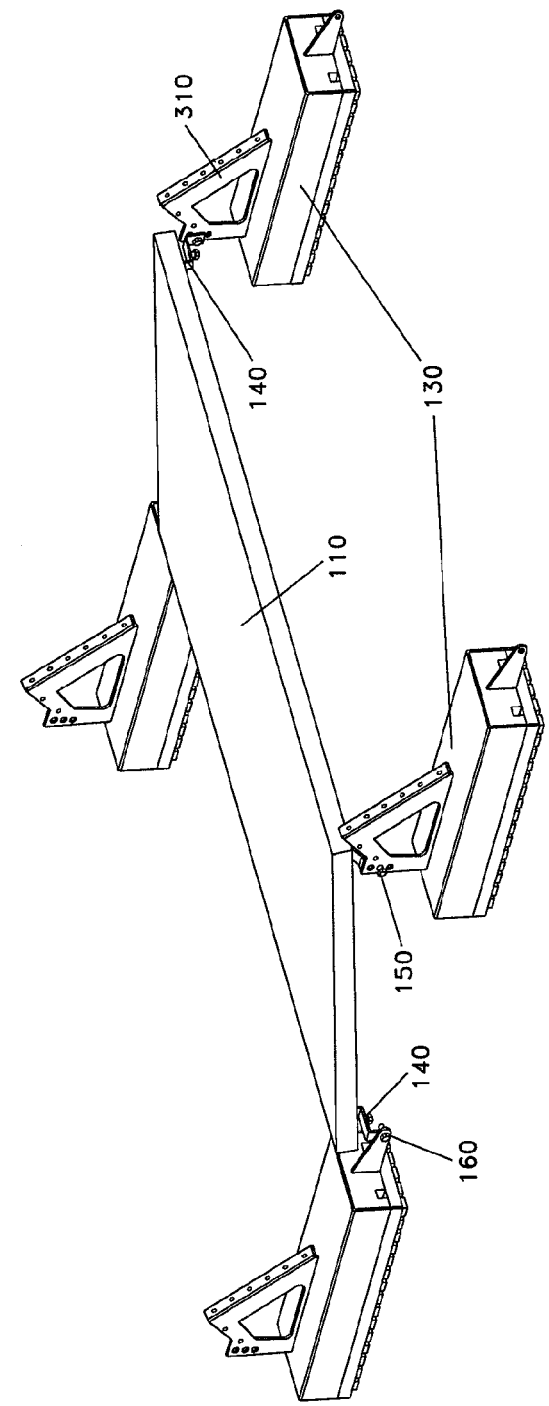
FIG. 8 is an isometric view of a solar panel module mounted to shoe elements according to an aspect of the present inventions.

FIGS. 6-8 illustrate one example of how attachment modules 140 may be utilized to attach solar panel modules 110 to shoe 130. FIG. 6 illustrates a solar panel module with three attachment modules 140 attached and one attachment module 140u unattached. As illustrated in FIGS. 6-8 an attachment module 140 may be attached to a solar panel module 110 by a threaded bolt 145 passing through a threaded hole in attachment module 140 to secure attachment module 140 to an inner edge of solar panel module 110. This provides for positioning and alignment of solar panel module 110 relative to shoe 130. Attachment modules 140 may be attached through non-threaded holes to shoe 130 by bolts passing through one of rear mounting holes 150 and forward mounting hole 160 for a rear and a forward attachment module 140 respectively. In this manner, solar panel modules 110 may be secured in place relative to shoe 130 and relative to one another in a fashion compatible with a number of commercially available solar panels. Other configurations may be designed to permit compatibility with multiple panel types whether attaching at this portion of the solar panel or designed for integration with future solar panels, based on the disclosure provided herein.

Figure 9:
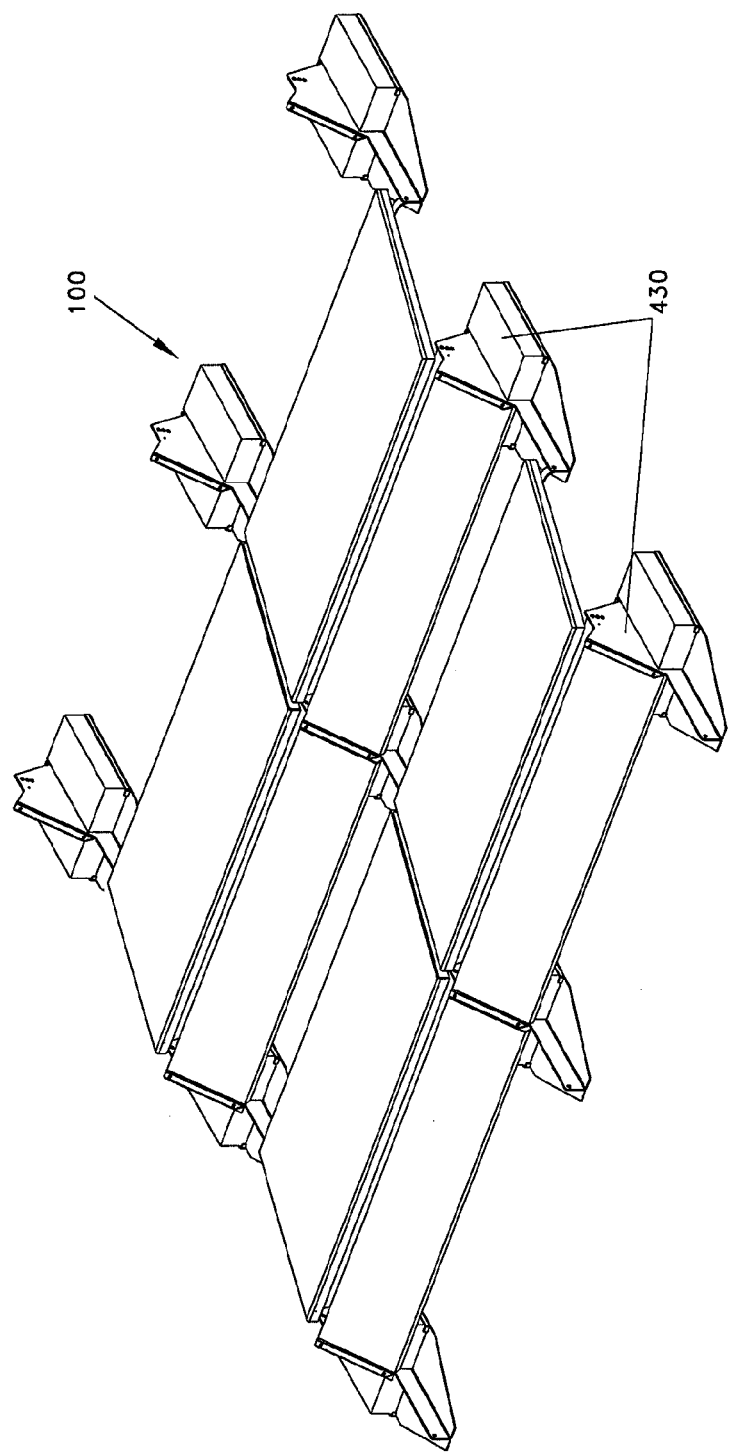
FIG. 9 is an array of solar panel modules according to another aspect of the present inventions.
Figure 10:
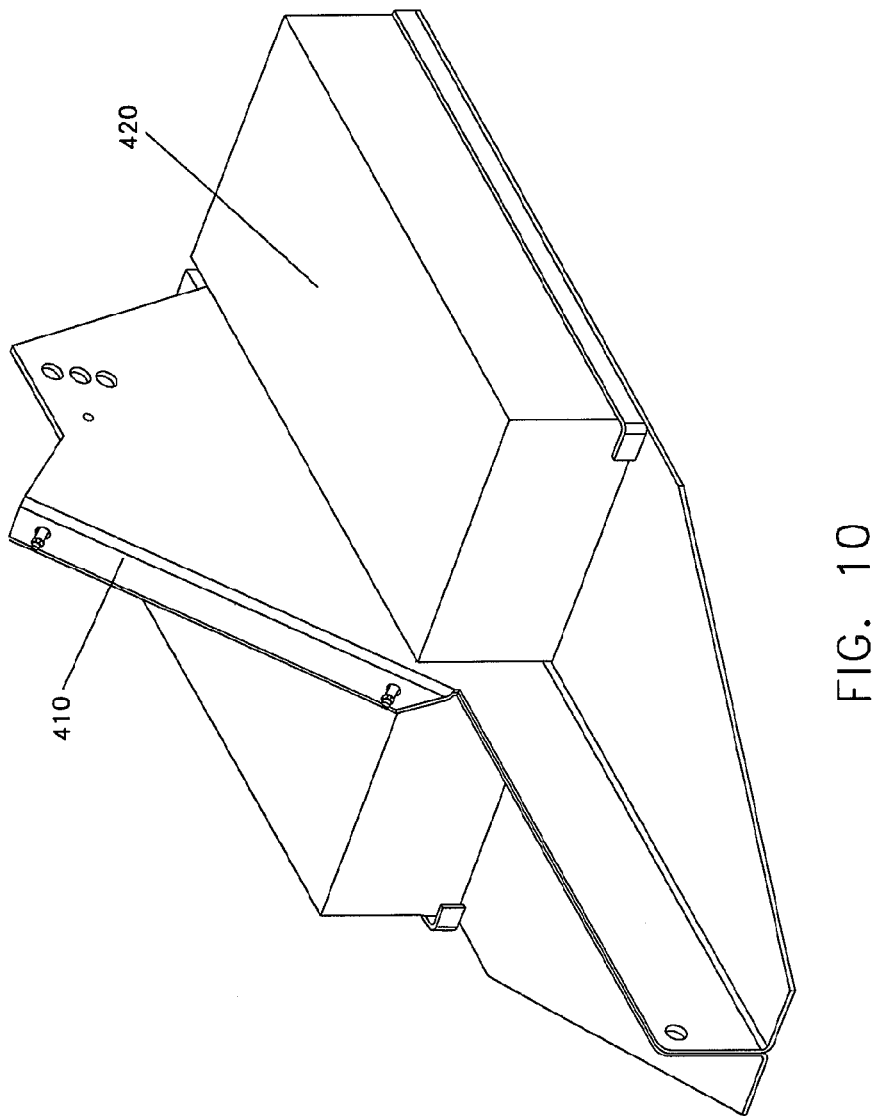
FIG. 10 is isometric view of a shoe element of a solar module mounting system according to another aspect of the present inventions.

FIG. 9 illustrates an array 100 of solar panel modules 110 with another embodiment of a shoe, e.g. shoe 430. Shoe 430 is illustrated in greater detail in FIG. 10. As illustrated in FIG. 10, shoe 430 may comprise multiple ballast elements 420. Illustrated in FIG. 10 is a shoe 430 with two similar sized ballast elements 420, one on each side of link 410. In this example, the link 410 is comprised of two pieces (a left and right side piece) as described below. The ballast elements may rest on link platform 415 illustrated in FIG. 11. In some embodiments, ballast elements 420 may be held in place on link platform 415 by forward retaining tab 415a, rear retaining tab 415b, and side retaining tab 415c. In some embodiments one or more of these tabs may be connected to one or more other of these tabs. In some embodiments, more or fewer retaining tabs may be present. In another embodiment, ballast elements 420 may additionally or alternatively be secured to link platform 415 by an adhesive, or by a fastener or fasteners such as, for example, screws or bolts.

Ballast elements 420 may in some embodiments comprise similar materials as ballast element 320 described above. In some embodiments, ballast elements 420 may comprise standard size concrete blocks, such as, for example, blocks with dimensions of 8 inches wide×8 inches tall×16 inches long, which may be available at numerous home improvement and/or building supply stores. Where the links are designed to permit use with standard sized, commercially available blocks, the need to ship heavy ballast elements along with other elements of the system may be reduced (although one could ship the ballast elements or design ballast element specifically for use with links 410). A purchaser/installer of the system could purchase the ballast blocks locally.

Although two similarly size ballast elements 420 are illustrated in FIG. 10, it is to be understood that alternate embodiments may include left and right and/or front and back ballast elements having different configurations, multiple ballast elements on each side, or a single ballast element. If more than two ballast elements are utilized, these ballast elements may comprise, for example, standard sized building materials, including, for example, standard sized bricks with dimensions of 3⅝ inches wide×2¼ inches high×8 inches long. If more than two ballast elements are used, they may be mounted on link platform 415 in a stacked or a side-by-side configuration, or both.

Figure 11:
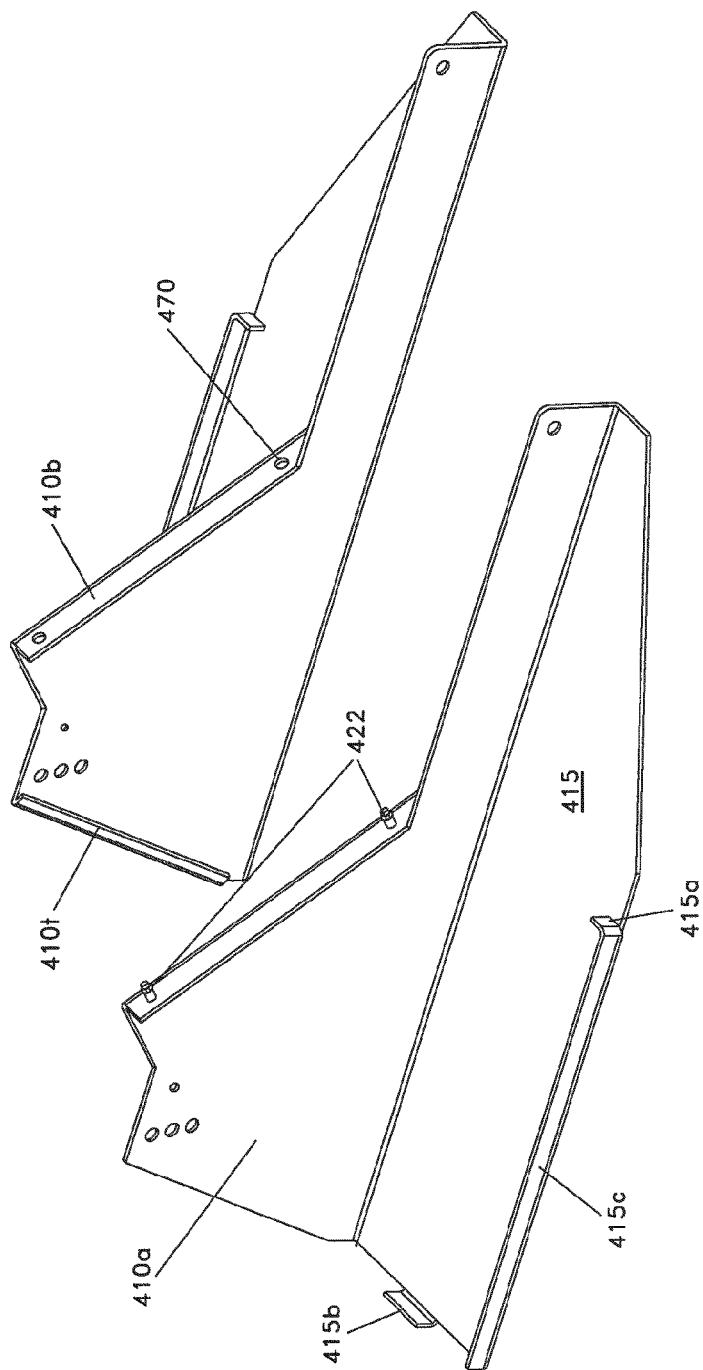
FIG. 11 illustrates a disassembled link member of a solar module mounting system according to another aspect of the present inventions.

Link 410 may be a single integral unit, or multiple units. As illustrated in FIG. 11, for example, link 410 may comprise two sides 410a and 410b. In this example, the sides include a mechanism for attaching the sides to each other. In this embodiment, the sides may be joined together by, for example, connectors 422 and tab 410t. Connectors 422 on link side 410a may fit though holes 470 in link side 410b. Tab 410t may fit about a rear portion of link side 410a. Connectors 422 may pass through holes 470 in link side 410a or may be bonded to link side 410a by means of, for example, welding or soldering. Connectors 422 may be, for example, bolts, pem nuts, or other connectors known in the art. In this example, once connectors 422 are passed through holes 470 in link side 410b, a securing element, such as, for example, a nut or a pin may be coupled to connectors 422 to secure link side 410a to link side 410b.

Figure 12:
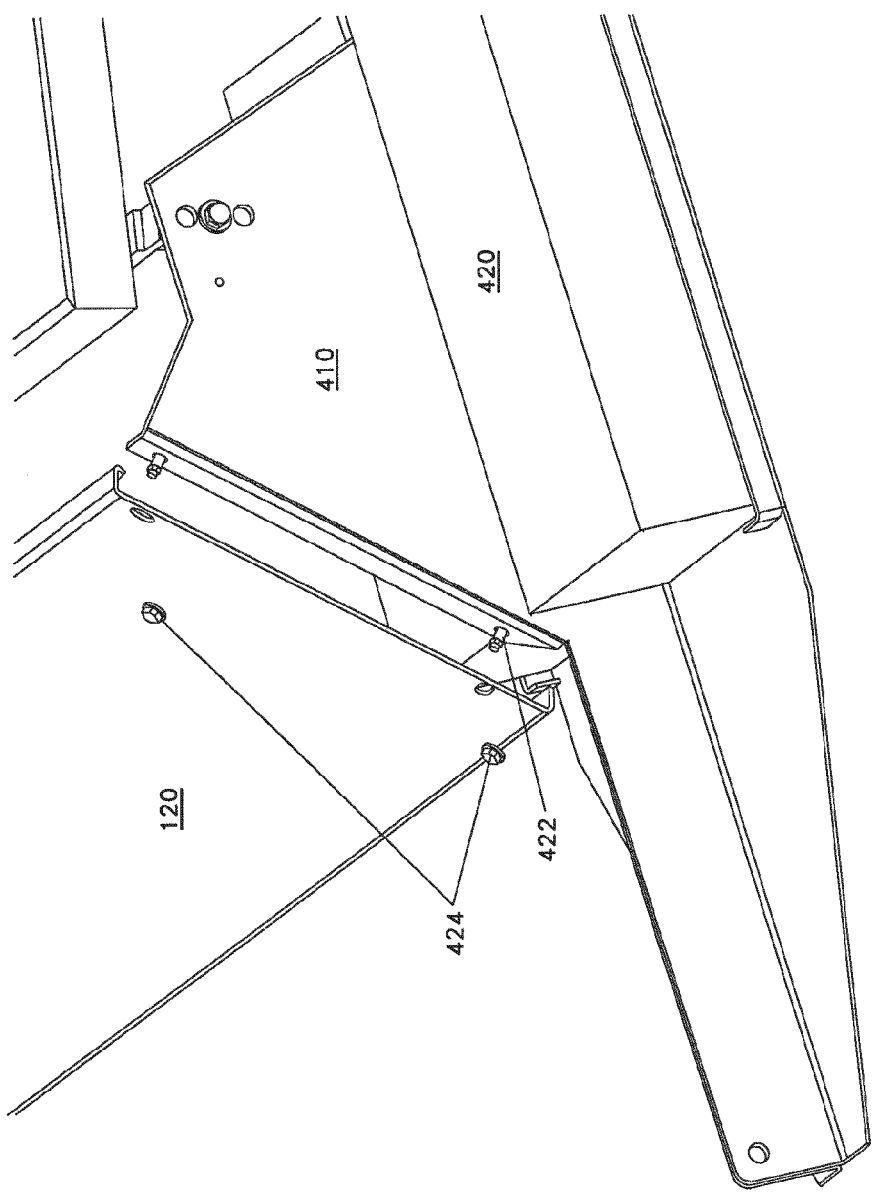
FIG. 12 illustrates connection of a deflector to a link member of a solar module mounting system according to another aspect of the present inventions.

FIG. 12 illustrates how a deflector 120 may be attached to shoe 430. In this example, link sides 410a and 410b are joined, and connectors 422 protrude from holes 470. A deflector 120 is then placed on link 410 such that connectors 422 extend through holes in the deflector 120. A securing element, in this example nut 424, is then used to secure the deflector 120 to link 410 by way of connectors 422. In other embodiments, alternative deflector mounting mechanisms may be used instead of or in addition to connectors 422. For example, in some embodiments, e.g., as detailed below with reference to FIGS. 14A-17B, the mechanism to facilitate attachment of deflectors may be designed to compensate for thermal expansion and contraction in the array 100.

In another embodiment, tabs on a first side 410b of link 410 may be positioned into and slid into place into holes or slots in link side 410a in order to join sides 410a and 410b. In other embodiments, tabs and/or holes and/or slots may be provided on either or both of sides 410a and 410b. Alternatively, sides 410a and 410b could be joined by welding, by an adhesive, by fasteners such as screws or bolts, or by other fastening methods known in the art. This may be done in advance or at the time of installation.

Link sides 410a and 410b may each comprise a mechanism or mechanisms to facilitate in mounting of deflectors. In some embodiments, the mechanism includes a number of deflector mounting holes 470. Link 410 may comprise 3 deflector mounting holes on one or both of sides 410a and 410b, or in other embodiments may comprise fewer or greater numbers of deflector mounting holes 470. Deflector mounting holes 470 on side 410a may be aligned or offset from deflector mounting holes 470 on side 410b. If the deflector mounting holes 470 on link sides 410a and 410b are aligned with each other, deflectors 120 may be mounted to link 410 which have mounting tabs and/or holes which are aligned on either side of the deflector 120. A side of one deflector 120 may be attached to link side 410a while a side of another deflector 120 may be attached to link side 410b.

Link 410 may comprise a pad or sole (not shown) on its underside. This pad or sole may be made from similar materials as described above with reference to sole 330.

Figure 13:
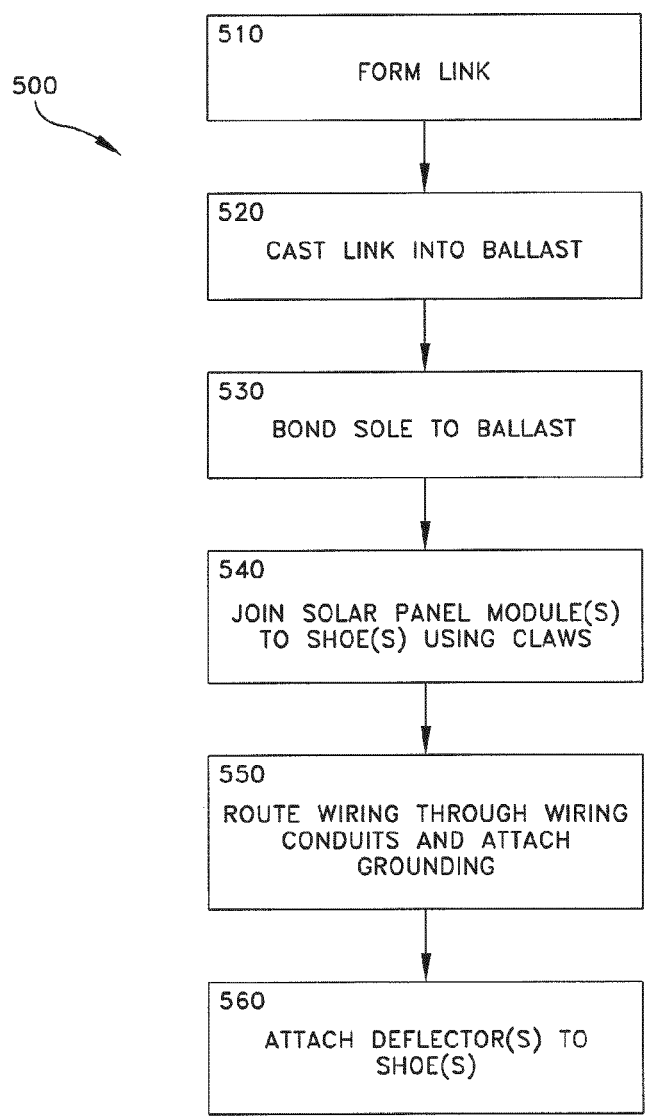
FIG. 13 is a flowchart of a method of forming a solar module integration system according to an aspect of the present inventions.

Referring to FIG. 13, there is illustrated a flowchart 500 of a method of forming a solar module integration system according to an aspect of the present inventions. In act 510 a link 310, 410 is formed. Link 310, 410 may be made from metals such as stainless steel, mild steel, or aluminum, UV resistant plastic, fiberglass, concrete, or other materials. In some embodiments, link 310, 410 may be made from 0.075 inch thick cold rolled mild steel. The mild steel may be cut, bent into the shape of link 310, 410, and hot-dip galvanized. In other embodiments, link 310, 410 may be extruded. In embodiments of link 310 similar to that illustrated in FIG. 4, link 310 may be formed as a single piece. In embodiments of link 410, similar to that illustrated in FIG. 11, the link 410 may be fabricated as two separate pieces 410a and 410b that are later joined. Rear mounting hole or holes 150, forward mounting hole or holes 160, deflector mounting hole or holes 170, and grounding attachment hole 180 may formed in link 310, 410 by for example, drilling or punching.

In act 520 the link 310, 410 is joined to a ballast 320, 420. Ballast 320, 420 may be formed from, for example, poured, dry cast, wet cast, or hydraulically pressed concrete, recycled rubber, polymer concrete, or other materials. Ballast 320, 420 may be bought off the shelf from a hardware or building supply store. In embodiments utilizing a link 310 similar to that illustrated in FIG. 4, the link 310 may be placed into a mold in which ballast 320 may be formed, thereby casting link 310 directly into ballast 320. Alternatively, ballast 320 may be formed with a slit cut for link 310 to be mounted into and link 310 may be mounted in this slit and secured using, for example, an adhesive or a fastener or fasteners such as screws or bolts. In embodiments utilizing a link 410 similar to that illustrated in FIG. 11, ballast or ballasts 420 may be secured to link platform 415 by forward retaining tab 415a, rear retaining tab 415b, and side retaining tab 415c. In other embodiments, ballast elements 420 may additionally or alternatively be secured to link platform 415 by an adhesive, or by a fastener or fasteners such as, for example, screws or bolts. Ballast 320, 420 may include one or more wire chases 340. These wire chases 340 may be molded into the ballast 320, 420, cut into the ballast after it is formed, or may be formed by casting a ½" diameter (or greater) piece or pieces of PVC pipe or other material into the ballast 320, 420 during the manufacture thereof.

In act 530, a sole 330 is attached to ballast 320. This act may be performed in embodiments utilizing a link similar to link 310 and a ballast 320 that has an exposed lower surface that may be at least partially covered by sole 330. In some embodiments, act 530 may be performed concurrently with act 520 wherein a sole 330 with extending fingers or other elements and/or intruding holes or recesses may be bound to ballast 320 by casting ballast 320 about the extending fingers or other elements and/or into the intruding holes or recesses. In other embodiments, sole 330 may be adhered to ballast 320 using an adhesive such as, for example, an epoxy, or by mechanical fasteners such as, for example, screws or bolts. The sole 330 may be formed from any material that can be considered an "inert pad" by the roofing industry. In some embodiments sole 330 may be made from recycled, non-vulcanized crumb rubber available from Unity Creations Ltd. of Hicksville, N.Y. In other embodiments sole 330 may be made from natural rubber or EPDM. In further embodiments, sole 330 may be formed of rubber or other material sprayed or deposited in liquid form onto ballast 320.

In embodiments where a link similar to link 410 is utilized and a sole is not desired to be attached to ballast 420 on an exposed on a lower surface, act 530 may be replaced by an act in which a sole 330 is bound to at least part of a lower surface of link 410. The sole 330 utilized in these embodiments may be formed of similar materials as the sole in embodiments where the sole is bound to a ballast 320. In embodiments where a link similar to link 410 is utilized, sole 330 may be bound to a lower surface of link 410 using an adhesive, such as for example, epoxy, using fasteners such as, for example, screws or bolts, or may be sprayed or melted onto a lower surface of link 410. Lower surface of link 410 may comprise holes, extrusions, or roughened areas (not shown) to facilitate the adherence of sole 330 thereto.

In act 540, the completed shoes 130, 430 are arranged on a roof or other mounting surface and solar panel modules 110 are attached thereto. Solar panel modules 110 may be attached to shoes 130, 430 utilizing attachment modules 140, as is illustrated in FIGS. 6-8 or may be joined to shoes 130, 430 using other fasteners or mechanisms known in the art. In instances where a mounting surface is not entirely level, solar panel modules 110 may be attached to different rear mounting holes 150 and/or different forward mounting holes 160 on different shoes in order to maintain the solar panel modules 110 in alignment with and/or at a similar horizontal level as adjacent solar panel modules 110. In some embodiments, additional stabilizing members, such as, for example, metal rails (not shown) may interconnect shoes 130. This may impart an increased rigidity to the solar panel module array. In some embodiments, shoes 130 may be mechanically attached to the roof or other mounting surface upon which they are mounted.

In act 550, wiring supplying power from solar panel modules 110 may be routed through wire chases 340 in ballasts 320, 420 and grounding wires may be attached to grounding terminal or hole 180. In some embodiments, shoe 130, 430 may be provided to an installation site with power and ground wires previously installed in wire chases 340.

In act 560, deflectors 120 may be attached to shoes 130, 430. Deflectors 120 may be adjustably mounted to shoes 130, 140 by the selection of appropriate mounting holes 170 on shoes 130, 430, or in some embodiments by aligning slot shaped mounting holes in deflector 120 to mounting holes 170. Deflectors 120 may in some embodiments be mounted to shoes 130, 430 such that upper edges of the deflectors are aligned with upper edges 210 of solar panel modules 110.

It is to be appreciated that acts 510-560 of flowchart 500 may in some embodiments be performed in alternate orders. It is also to be appreciated that not all acts need be performed in all embodiments, and that in some embodiments additional or alternate acts may be performed.

Figure 14A:
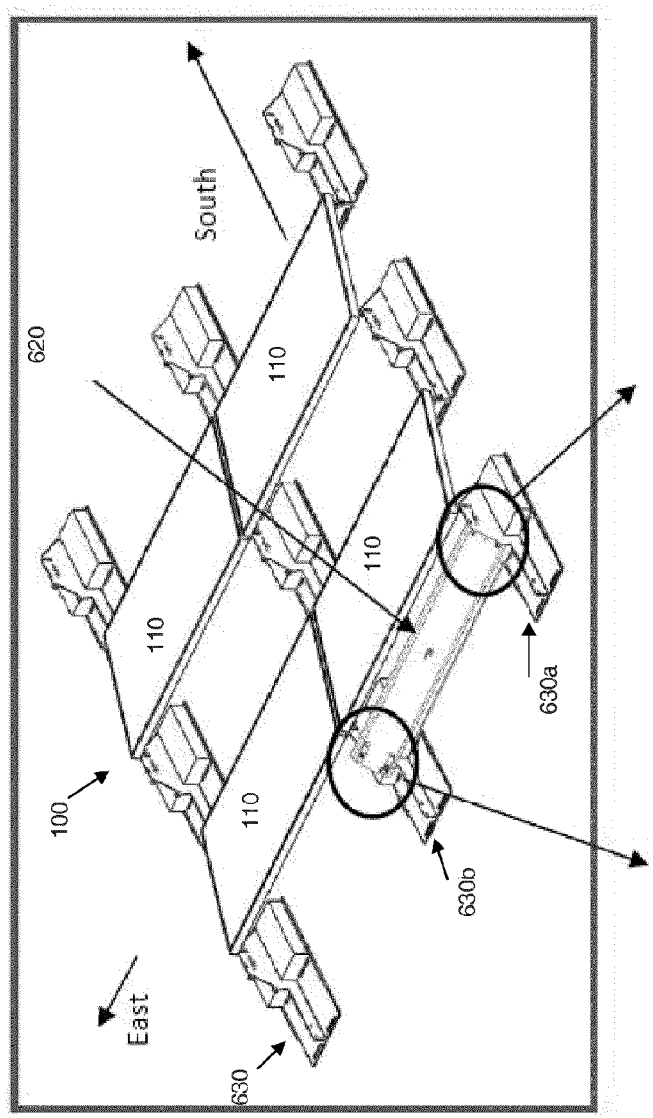
FIG. 14A is a perspective view of panel array featuring thermal compensation with a single attached deflector.
Figure 14C:
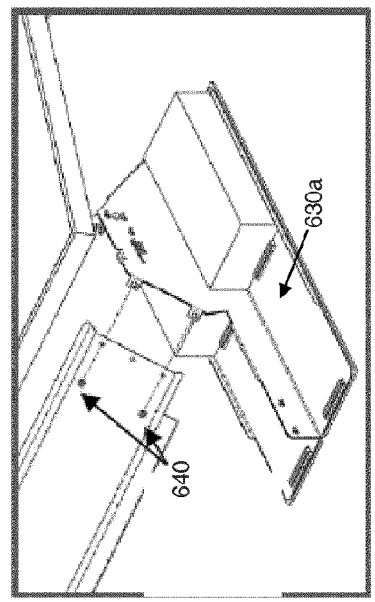
FIG. 14C is a detailed exploded view of the panel array of FIG. 14A.
Figure 14B:
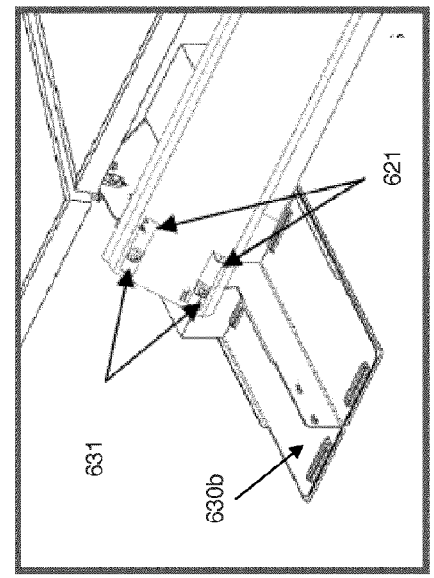
FIG. 14B is a detailed exploded view of the panel array of FIG. 14A.

FIGS. 14A-C illustrate an embodiment of solar panel array 100 featuring mechanisms which compensate for thermal expansion and contraction of one or more components, e.g., wind deflectors 620. This will reduce or even eliminate cumulative movement of or forces on array 100.

In the embodiments described in FIGS. 14A-17B, an exemplary orientation of the array with respect to the cardinal directions is shown for illustrative purposes only. In various embodiments any other suitable orientation may be used.

As in the embodiments described above, wind deflectors 620 are elongated components positioned to span the edge of solar panel modules 110 and streamline the array by deflecting some or all wind over rather than underneath the modules 110. Each deflector 620 is attached to two shoes 630 (although in some embodiments, a deflector may be attached to fewer or more shoes). The attachments include a mechanism which allows for local movement of deflector 620 as it thermally expands or contracts. For example, in the illustrated embodiment, one end (as shown the eastern end) of deflector 620 includes a pair of slots 621. The other end (as shown the western end) of deflector 620 includes a pair of holes 622 (as shown, round bolt holes). The holes 622 are used to attach the western end of deflector in a fixed fashion to a first shoe 630a, e.g., using mounting tabs 631 on the shoe. The slots 621 are used to attach the eastern end of deflector 620 in a slidable fashion to a second shoe 630b, e.g., using mounting tabs 631 on the shoe. As deflector 620 undergoes thermal expansion and contraction, slots 621 allow local movement of the deflector in one or more directions (e.g., in the east-west direction, as shown) without causing cumulative movement of the system of or applying forces to other components in the system.

It is to be understood that in some embodiments, the positioning of slots 621 and holes 622 may be reversed, such that slots 621 are on the western end of deflector 620 and holes 622 are located on the eastern end. In other embodiments, other suitable positioning of the slots and holes may be used.

It is to be understood that in various embodiments, more or fewer slots 621 and holes 622 may be used. In various embodiments the slots 621 may be rectangular, oval, round, polygonal, or any other suitable shape. In various embodiments, the holes 622 may be round, square, rectangular, polygonal, or any other suitable shape. In various embodiments the holes may be threaded or unthreaded.

In some embodiments, slots 621 are rectangular in shape with dimensions of about one inch by about six inches. In some embodiments, holes 622 have a diameter of about ⅜ inch. However, it is to be understood that any suitable dimensions may be used.

Figures 15A, 15B:
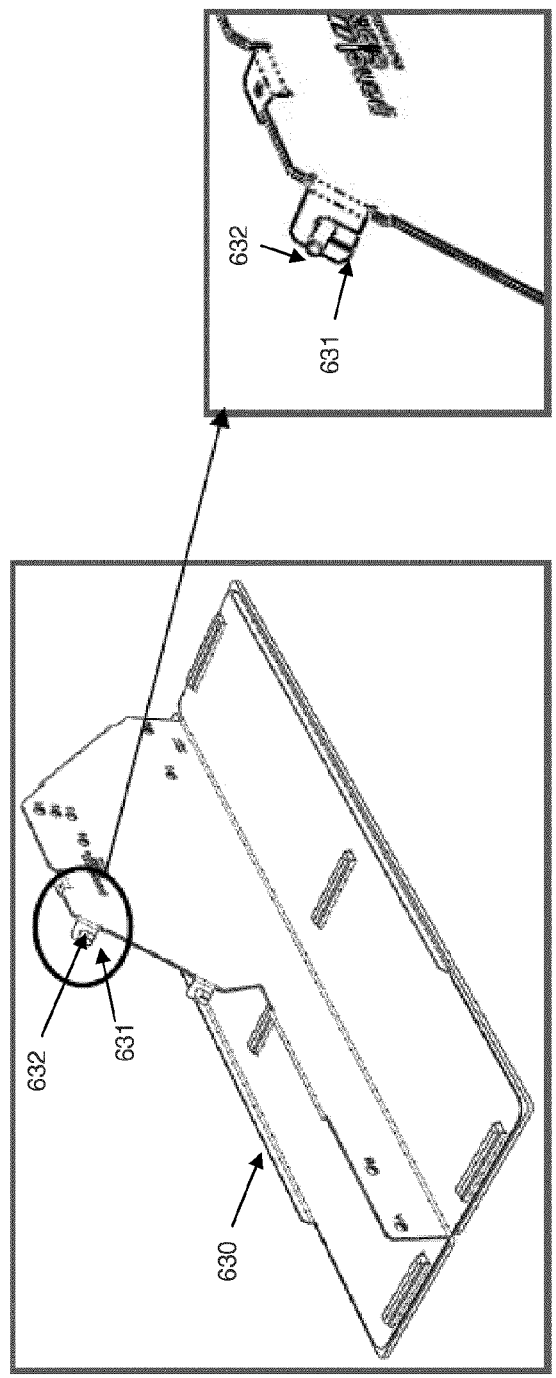
FIG. 15A is a perspective view of a shoe from the panel array shown in FIG. 14A.
FIG. 15B is a detailed perspective view of the shoe of FIG. 15A showing mounting tabs.
Figure 15C:
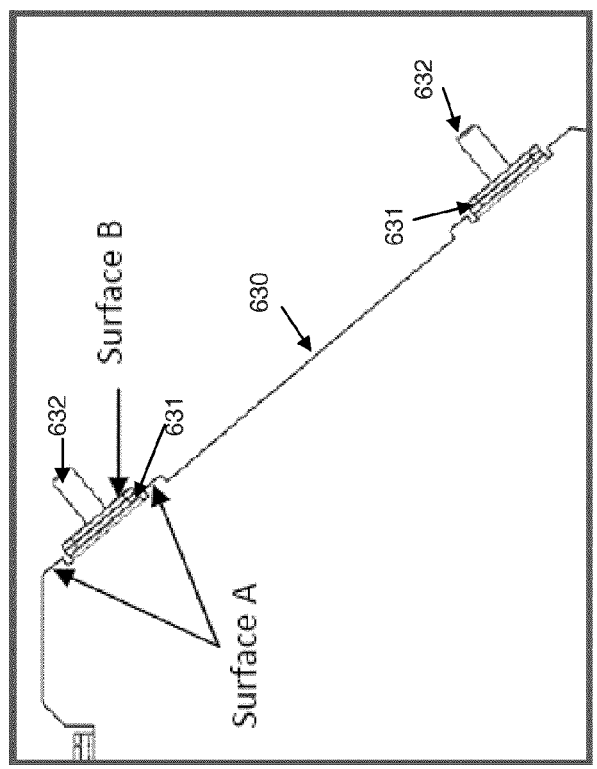
FIG. 15C is a detailed side view of the shoe of FIG. 15A showing mounting tabs.
Figures 16A, 16B:
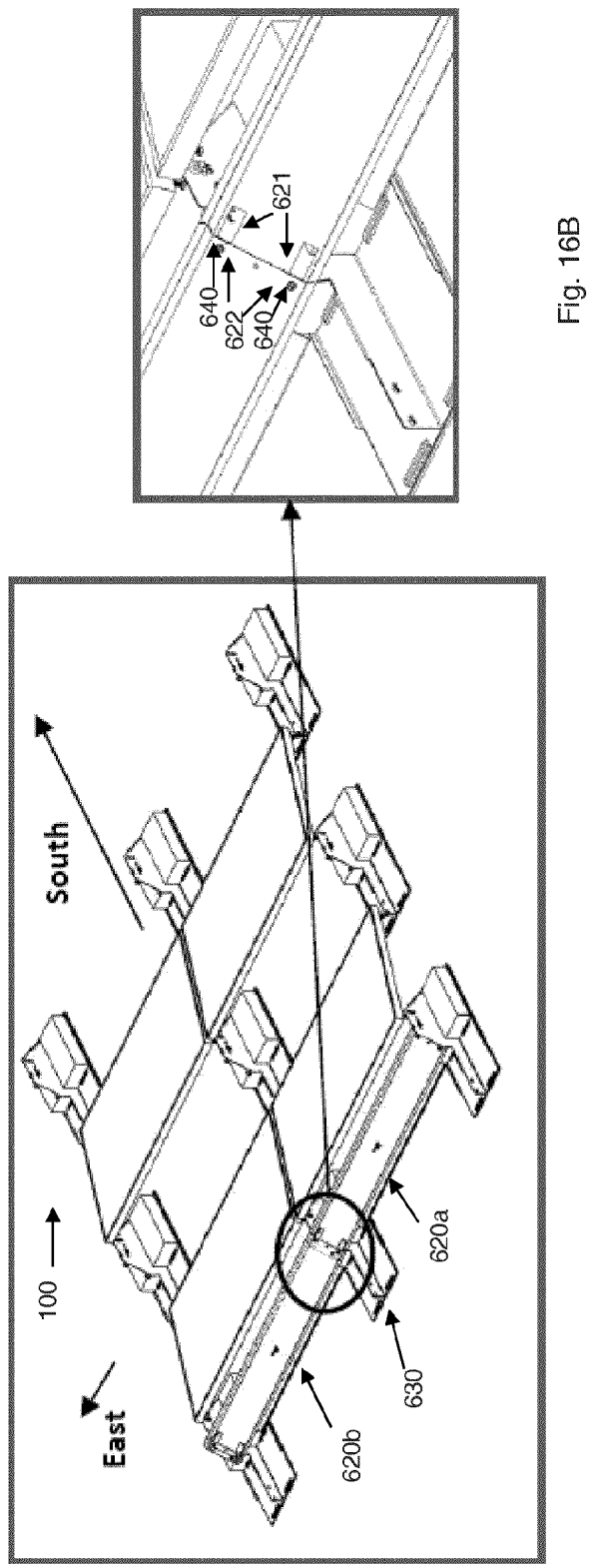
FIG. 16A is a perspective view of panel array featuring thermal compensation with multiple attached deflectors.
FIG. 16B is a detailed perspective view of the panel array of FIG. 16A.
Figure 16D:
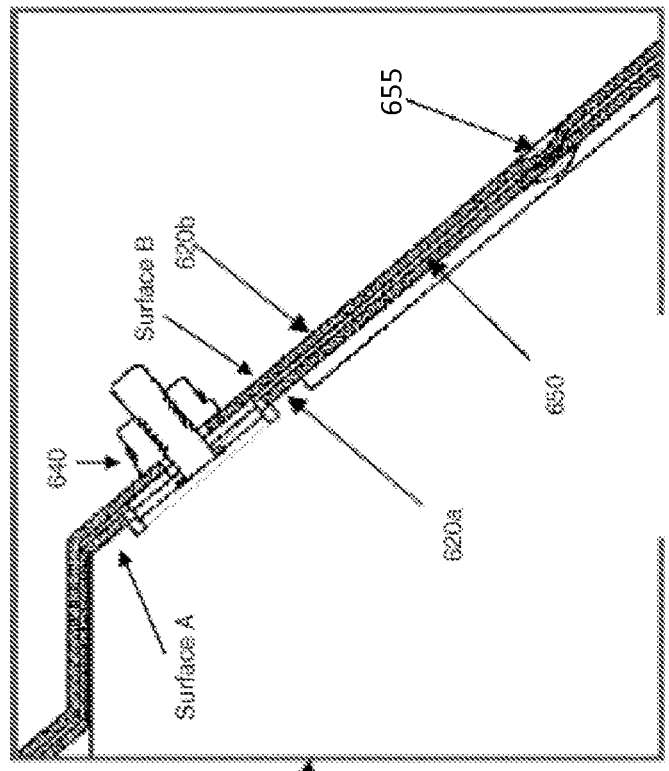
FIG. 16D is a detailed side view of a shoe with attached deflectors from the panel array of FIG. 16A.
Figure 16C:
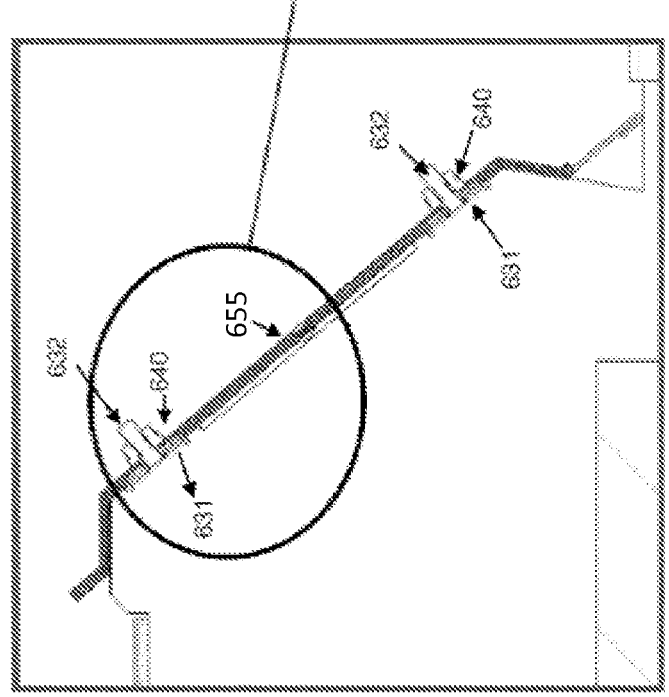
FIG. 16C is a side view of a shoe with attached deflectors from the panel array of FIG. 16A.

As shown in FIGS. 15A-C, shoe 630 includes a pair of mounting tabs 631. Each mounting tab 631 includes a bolt member 632. The bolt member 632 may be threaded, e.g., to receive a nut such as a hex nut. The mounting tab includes a raised surface for receiving end of a deflector 620 which includes holes 622.

FIGS. 16A-D illustrate the attachment of two deflectors 620a, 620b to shoe 630. Shoe 630 receives the eastern, slotted end of first deflector 620a. Tabs 631 are sized to pass through slot 621 (e.g., with clearance of less than 1 mm, less than 0.1 mm, etc., e.g., in the range of 0.1 mm-25 mm or any subrange thereof). Each tab 631 includes a bolt member 632 which extends through slots 621 in the eastern end of the first deflector 620a and fits through one of the holes 622 in the western end of the second deflector 620b. Nut 640, e.g., a serrated flange hex nut, may then be used to secure the western end of deflector 620b to mounting tab 631. First deflector 620a rests on surface "A" of shoe 630 as shown in FIG. 15C. Second deflector 620b rests on exposed mounting tab surface "B" as shown in FIG. 15C. The surface B is parallel with but raised relative to surface A, such that when the second deflector is secured to mounting tab 631 (e.g., using serrated flange nuts), there is a gap 650 between two deflectors. The gap 650 allows the eastern, slotted end of the first deflector 620a to slide underneath the western end of the second deflector 620b. For example, the gap 650 may be about 0.01 mm or more, 0.1 mm or more, 1.0 mm or more, 10 mm or more, e.g., in the range of 0.1-20 mm or any subrange thereof. Note that although, as shown, the deflector 620a is shown flush against surface "A", in some embodiments, deflector 620a may move or "float" in the space between surface "A" and the surface of deflector 620b that faces towards deflector 620a.

In some embodiments, the deflectors 620a, 620b may include detents 655 which apply pressure between the deflectors 620a, 620b and/or shoe 630 to reduce or eliminate vibration and noise (e.g., caused by natural forces such as wind or rain, or by other sources such as building vibration). The amount of pressure may be chosen such that detents 655 do not substantially interfere with the sliding motion of the deflectors. In some embodiments, each deflector 620 includes a first detents 655 positioned midway along the line connecting the pair of slots 621 in its eastern end and a second detents 655 positioned midway along the line connecting pair of slots 621 in its eastern end. In various embodiments any other suitable number or arrangement of détentes may be used.

Figure 17B:
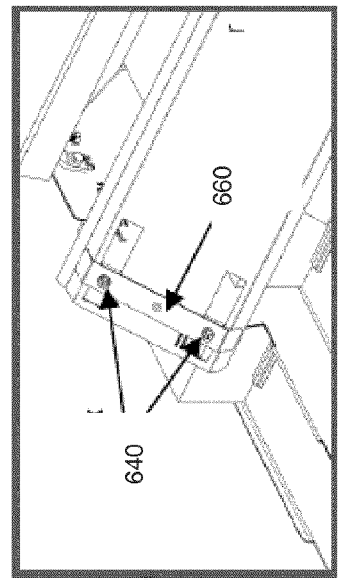
FIG. 17B is a perspective view of the panel array of FIG. showing the attached edge plate.
Figure 17A:
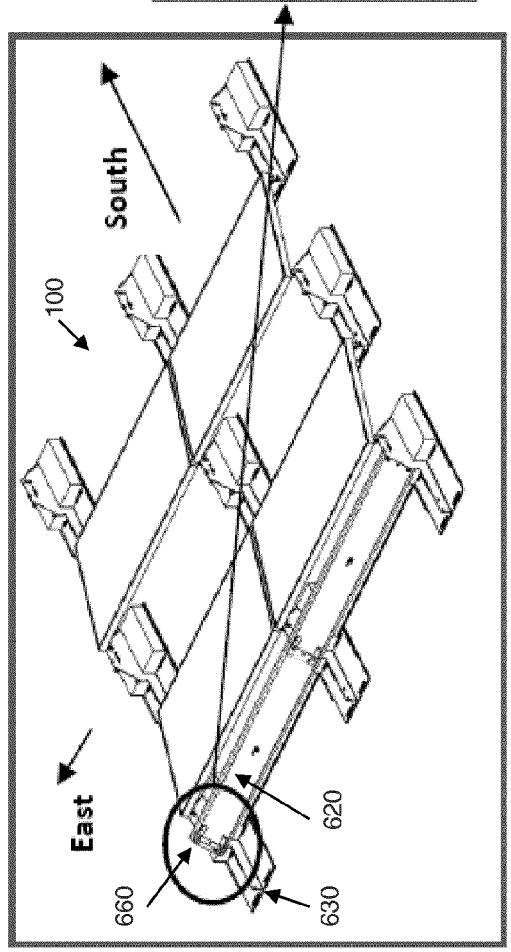
FIG. 17A is a perspective view of a panel array featuring thermal compensation with multiple attached deflectors and an attached edge plate.

FIGS. 17A and 17B illustrate the attachment of the eastern end of a deflector 620 to the shoe 630 at the easternmost edge of panel array 100. For the shoes 630 at the eastern edge of the array, there is no western end of a second deflector 620 to be attached. Instead, a plate 660 is provided with a pair of bolt holes. The plate is placed over the slotted end of the deflector 620 after the deflector is fitted over the mounting tabs 631. Bolt members pass through the holes in the plate 660, allowing the plate to be secured with nuts 640. The plate 660 rests on the surface of mounting tabs 631 such that a gap is maintained between plate 660 and the underlying deflector 620. According, the eastern end of the deflector 620 is free to slide under plate 660. Note that deflector 620 may move or "float" in the space the surface of shoe 630 and the surface of plate 660 that faces towards deflector 620. Note that, although plates 660 are shown applied at the eastern edge of array 100, in other configurations (e.g., where the position of slots 621 and holes 622 are reversed on deflectors 620) they may be used in any other suitable position.

In the above described embodiments, thermally induced expansion and contraction may cause the motion of various components against one another. Accordingly, in order to reduce wear, in some embodiments lubrication, protective coatings, or strengthened/reinforced material may be provided at areas where components move (e.g., slide) against one another.

Various examples have been given for devices, systems and methods for mounting solar modules. As used herein, the term solar module refers to a complete, environmentally protected unit designed to generate power when exposed to sunlight and comprising one or more solar cells and, optionally, optics and/or other components (typically exclusive of a tracker). In some embodiments, the solar module may be substantially flat (i.e., having a length and width much greater, e.g., 10 times greater, 100 times greater, or more than its thickness).

A solar cell is a photovoltaic device that generates electricity when exposed to light. However, some embodiments of the devices used herein may be used for mounting solar modules or arrays or solar modules, where the term solar panel refers to collection of cells mechanically fasten together, wired, and designed to provide a field-installable unit. Various embodiments may be used to mount any other suitable devices (e.g. mirrors, heat tubes, thermoelectric devices, optical devices, etc.).

It is to be noted that the above definitions of solar module, solar cell, and solar panel module are consistent with Article 690 of the National Electrical Code published in 2005 by the National Fire Protection Association. However, in the art, these terms are sometimes used interchangeable or imprecisely. It is to be understood that various embodiments of the devices, systems and methods described herein may be used to mount any suitable devices including solar module, solar cell, and solar panel or combinations thereof.

It is to be understood that the thermal concentration techniques described above may be applied to other embodiments of panel array 100 including those described herein and those described in U.S. patent application Ser. No. 12/846259, filed Jul. 29, 2010 and entitled "GROUND MOUNTED SOLAR MODULE INTEGRATION SYSTEM," the entire contents of which are incorporated by reference herein. For example, in some embodiments, shoe 630 may include a single piece embedded link of the general type described with reference to FIGS. 1-3. In other embodiments, shoe 630 may include a single or multi piece ballast bearing link member of the general type described with reference to FIGS. 9-12. In other embodiments, any suitable combinations or modifications of these elements may be used.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An apparatus for supporting a solar module comprising:
a first support member;
a second support member;
a first wind deflector configured to be attached to the first support member and the second support member, the first wind deflector including a first lateral end having a pair of elongated slots and a second lateral end having a pair of holes, each of the pair of holes having a diameter smaller than a length of each of the elongated slots;
a first attachment mechanism configured to attach the first support member to the first lateral end of the first wind deflector via the pair of elongated slots to allow local motion of the first wind deflector relative to the first support member in response to thermal expansion or contraction of the first wind deflector, the first attachment mechanism configured to attach the pair of holes of the second lateral end of a second wind deflector to the first support member via the pair of elongated slots in the first lateral end of the first wind deflector, wherein the first lateral end of the first wind deflector overlaps at least a portion of the second lateral end of the second wind deflector; and
a second attachment mechanism configured to attach the second lateral end of the first wind deflector to the second support member via the pair of holes in a fixed fashion to restrain local motion of the first wind deflector relative to the second support member in response to thermal expansion or contraction of the wind deflector.

2. The apparatus of claim 1, wherein:
the first attachment mechanism is configured to attach the second wind deflector to the first support member in a fixed fashion to restrain local motion of the second wind deflector relative to the first support member in response to thermal expansion or contraction of the second wind deflector.

3. The apparatus of claim 2, wherein the attachment mechanism is configured to allow the first support member to slide relative to the second wind deflector.

4. The apparatus of claim 3, wherein, when attached to each other, the first support member and the second wind deflector cooperate to restrict movement of the first wind deflector relative to the second wind deflector along a first direction, while allowing movement of the first wind deflector relative to the second wind deflector along a second direction transverse to the first direction.

5. The apparatus of claim 4, wherein:
at least one of the holes of the second wind deflector has a maximum dimension smaller than the maximum dimension of the elongated slot; and
the first attachment mechanism comprises a mounting tab on the support member comprising:
a mounting surface; and
a mounting protrusion extending in a direction transverse the mounting surface; and,
wherein the mounting surface is configured to receive the first and second wind deflectors such that:
at least a portion of the first wind deflector is in contact with the mounting surface;
at least a portion of the second wind deflector overlays the portion of the first wind deflector in contact with the mounting surface; and
the mounting protrusion extends through the elongated slot in the first wind deflector and the hole in the second wind deflector.

6. The apparatus of claims 4, wherein at least one of the wind deflectors comprises a detent configured to apply pressure between the wind deflector and another wind deflector or the first support member, without restraining movement of the first wind deflector relative to the second wind deflector along a second direction.

7. The apparatus of claim 5, wherein the first attachment mechanism comprises a fastener configured to be received on the protrusion and restrict motion of the first and second wind deflectors in the direction transverse to the mounting surface.

8. The apparatus of claim 5, wherein:
the mounting surface comprises one or more features configured to position the second wind deflector, when attached to the first support member, to define a gap space between the second wind deflector and the first support member that receives a portion of the first wind deflector, and
the portion of the first wind deflector in the gap is able to slide between the second wind deflector and the first support member along the mounting surface.

9. The apparatus of claim 8, wherein, when attached to the first support member, the portion of the first wind deflector in the gap is maintained flush against the mounting surface.

10. The apparatus of claim 8, wherein when attached to the first support member, the portion of the first wind deflector in the gap is positioned flush with the mounting surface floats within the gap.

11. The apparatus of claim 1, wherein at least one of the wind deflectors comprises:
an elongated member extending from a first end to a second end; and
wherein the first end comprises at least one elongated slot; and
wherein the second end comprises at least at least one hole having a maximum dimension smaller than the maximum dimension of the elongated slot.

12. A method of supporting a solar module comprising:
obtaining a first support member;
obtaining a second support member;
obtaining a first wind deflector including a first lateral end having a pair of elongated slots and a second having a pair of holes, each of the pair of holes having a maximum dimension smaller than the maximum dimension of each of the elongated slots;
attaching the solar module to the first support member and the second support member;
attaching the first support member to the first lateral end of the first wind deflector using a first attachment mechanism and the pair of elongated slots in a fashion that allows local motion of the first wind deflector relative to the first support member in response to thermal expansion or contraction of the first wind deflector
attaching the pair of holes of the second lateral end of a second wind deflector to the first support member via the pair of elongated slots in the first lateral end of the first wind deflector, wherein the first lateral end of the first wind deflector overlaps at least a portion of the second lateral end of the second wind deflector; and
attaching the second support member to the second lateral end of the first wind deflector using a second attachment mechanism and the pair of holes in a fixed fashion to restrain local motion of the first wind deflector relative to the second support member in response to thermal expansion or contraction of the wind deflector.

13. The method of claim 12, further comprising:
using the first attachment mechanism, attaching the second wind deflector to the first support member in a fixed fashion to restrain local motion of the second wind deflector relative to the first support member in response to thermal expansion or contraction of the wind deflector.

14. The method of claim 13, further comprising:
attaching the second wind deflector to the first support member using the first attachment mechanism to allow the first support member to slide relative to the second wind deflector.

15. The method of claim 14, wherein the first support member and the second wind deflector cooperate to restrict movement of the first wind deflector relative to the second wind deflector along a first direction, while allowing movement of the first wind deflector relative to the second wind deflector along a second direction transverse to the first direction.

16. A solar module mounting system comprising:
a plurality of apparatus for supporting a solar panel configured to support an array of solar modules, each apparatus comprising:
a first support member;
a second support member;
a first wind deflector configured to be attached to the first support member and the second support member, the first wind deflector including a first lateral end having a pair of elongated slots and a second lateral end having a pair of holes, the holes having a maximum dimension smaller than the maximum dimension of the elongated slots;

a first attachment mechanism configured to attach the first support member to the first lateral end of the first wind deflector via the pair of elongated slots to allow local motion of the first wind deflector relative to the first support member in response to thermal expansion or contraction of the first wind deflector, the first attachment mechanism configured to attach the pair of holes of the second lateral end of a second wind deflector to the first support member via the pair of elongated slots in the first lateral end of the first wind deflector, wherein the first lateral end of the first wind deflector overlaps at least a portion of the second lateral end of the second wind deflector; and a second attachment mechanism configured to attach the second lateral end of the first wind deflector to the second support member via the pair of holes in a fixed fashion to restrain motion of the first wind deflector relative to the second support member in response to thermal expansion or contraction of the wind deflector, wherein, during operation, the first attachment mechanism operates to reduce or eliminate system wide mechanical forces caused by thermal expansion or contraction of the first wind deflector and at least one other wind deflector.

\* \* \* \* \*